US012501258B2

United States Patent
Perras et al.

(10) Patent No.: US 12,501,258 B2
(45) Date of Patent: Dec. 16, 2025

(54) METHODS, APPARATUS AND SYSTEMS FOR SECURED RADIO RESOURCE CONTROL (RRC) SIGNALING OVER A PC5 INTERFACE FOR UNICAST COMMUNICATION

(71) Applicant: InterDigital Patent Holdings, Inc., Wilmington, DE (US)

(72) Inventors: Michelle Perras, Montreal (CA); Samir Ferdi, Kirkland (CA); Martino Freda, Laval (CA); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 751 days.

(21) Appl. No.: 17/441,796

(22) PCT Filed: Mar. 24, 2020

(86) PCT No.: PCT/US2020/024443
§ 371 (c)(1),
(2) Date: Sep. 22, 2021

(87) PCT Pub. No.: WO2020/198216
PCT Pub. Date: Oct. 1, 2020

(65) Prior Publication Data
US 2022/0174481 A1    Jun. 2, 2022

Related U.S. Application Data

(60) Provisional application No. 62/824,001, filed on Mar. 26, 2019.

(51) Int. Cl.
*H04W 12/37* (2021.01)
*H04W 12/03* (2021.01)
(Continued)

(52) U.S. Cl.
CPC ....... *H04W 12/03* (2021.01); *H04W 12/0471* (2021.01); *H04W 12/10* (2013.01);
(Continued)

(58) Field of Classification Search
CPC ......... H04W 4/40; H04W 4/46; H04W 12/37; H04W 12/106; H04W 12/10;
(Continued)

(56) References Cited

U.S. PATENT DOCUMENTS

2016/0065362 A1*  3/2016  Choyi ................. H04L 63/065
                                                          380/279
2019/0104134 A1*  4/2019  Lee ....................... H04W 12/10
(Continued)

FOREIGN PATENT DOCUMENTS

TW           201822559 A      6/2018

OTHER PUBLICATIONS

Qualcomm Inc.: "Security establishment procedures for Prose one-to-one communication", 3GPP Tdoc C1-161418 3GPP TSG-CT WG1 Meeting #96, Jeju (Korea), Feb. 15-19, 2016, 37 pages.

3rd Generation Partnership Project; Technical Specification Group Services and System Aspects; Architecture enhancements for V2X services, (Release 15), 3GPP TS 23.285 V15.1.0, Jun. 2018, 36 pages.

(Continued)

*Primary Examiner* — Matthew D. Anderson
*Assistant Examiner* — Dung L Lam
(74) *Attorney, Agent, or Firm* — Majid Albassam

(57) ABSTRACT

Method, apparatus and systems are disclosed that may be implemented in a Wireless Transmit/Receive Unit (WTRU) for unicast communication with another WTRU. The method may include sending, by the WTRU to the other WTRU via a PC5 interface, a communication request indicating first security information for the WTRU and receiving, by the WTRU from the other WTRU via the PC5 interface, information which is integrity protected indicating second security information for the other WTRU. The method may also include deriving, by the WTRU from the (Continued)

indicated second security information, a first set of security keys for communication via a first layer using the U-plane and a second set of security keys for communication via a second layer using the C-plane; and sending, by the WTRU to the other WTRU via the PC5 interface, a message that is at least integrity protected using the derived first set of keys.

10 Claims, 12 Drawing Sheets

(51) Int. Cl.
*H04W 12/0471* (2021.01)
*H04W 12/10* (2021.01)
*H04W 4/40* (2018.01)
*H04W 12/041* (2021.01)

(52) U.S. Cl.
CPC .............. *H04W 12/37* (2021.01); *H04W 4/40* (2018.02); *H04W 12/041* (2021.01)

(58) Field of Classification Search
CPC ........... H04W 12/0471; H04W 12/041; H04W 12/037; H04W 12/033; H04W 12/03; H04L 63/045; H04L 63/0428
See application file for complete search history.

(56) References Cited

U.S. PATENT DOCUMENTS

| | | |
|---|---|---|
| 2019/0174571 A1 | 6/2019 | Thangaraj et al. |
| 2019/0200228 A1* | 6/2019 | Adrangi ................ H04L 9/3268 |
| 2020/0221298 A1* | 7/2020 | Pan ....................... H04W 12/50 |
| 2021/0258793 A1* | 8/2021 | Rohini ................. H04W 12/033 |

OTHER PUBLICATIONS

ETSI TS 133 303 V15.0.0; "Universal Mobile Telecommunications System (UMTS); LTE; Proximity-based Services (ProSe); Security aspects (3GPP TS 33.303 version 15.0.0 Release 15)", Jul. 2018, 90 pages.

* cited by examiner

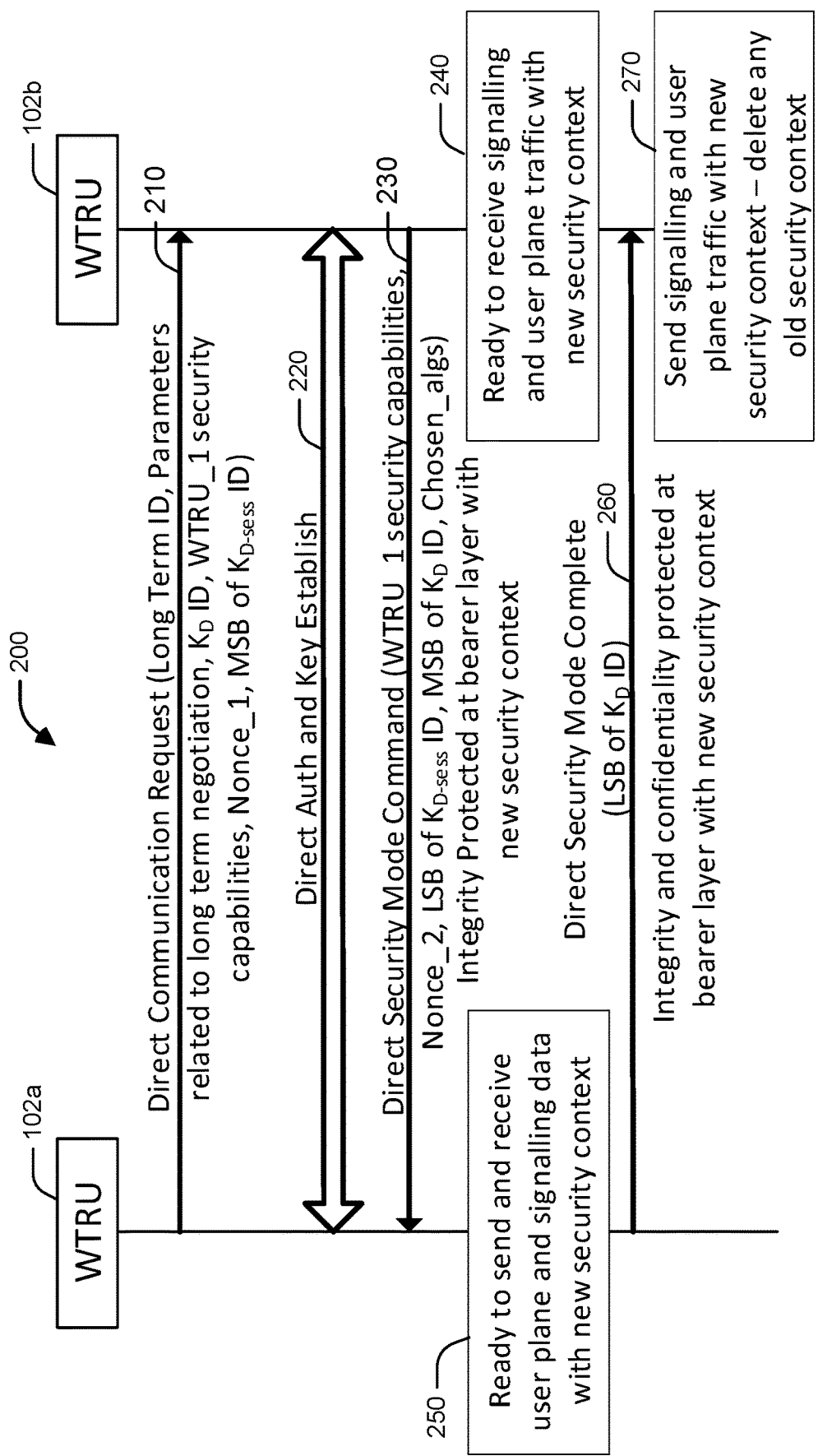
FIG. 2: Security Establishment at Connection Setup

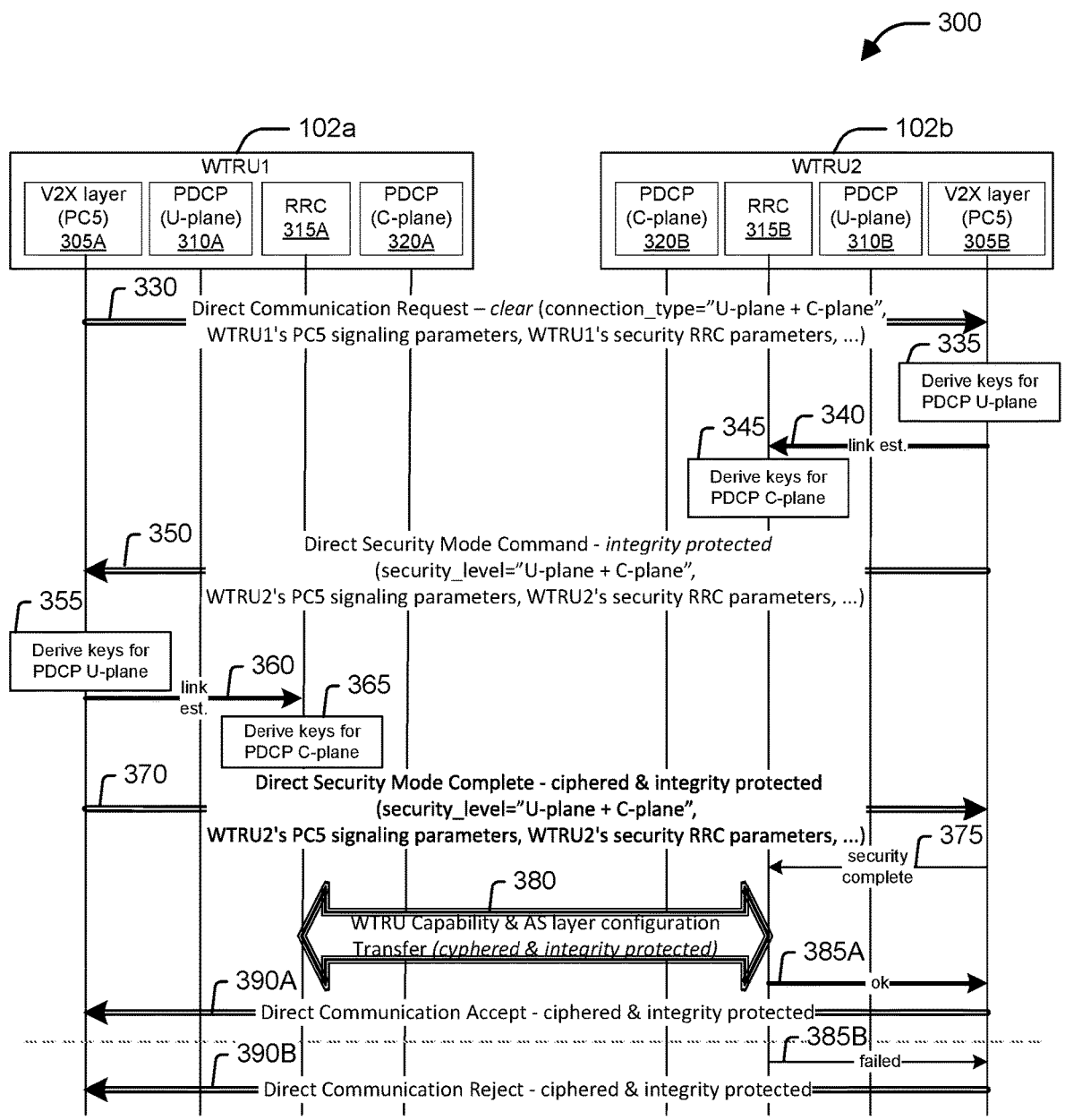
FIG. 3: Combined Security Establishment at PC5 Signaling Layer – over U-plane

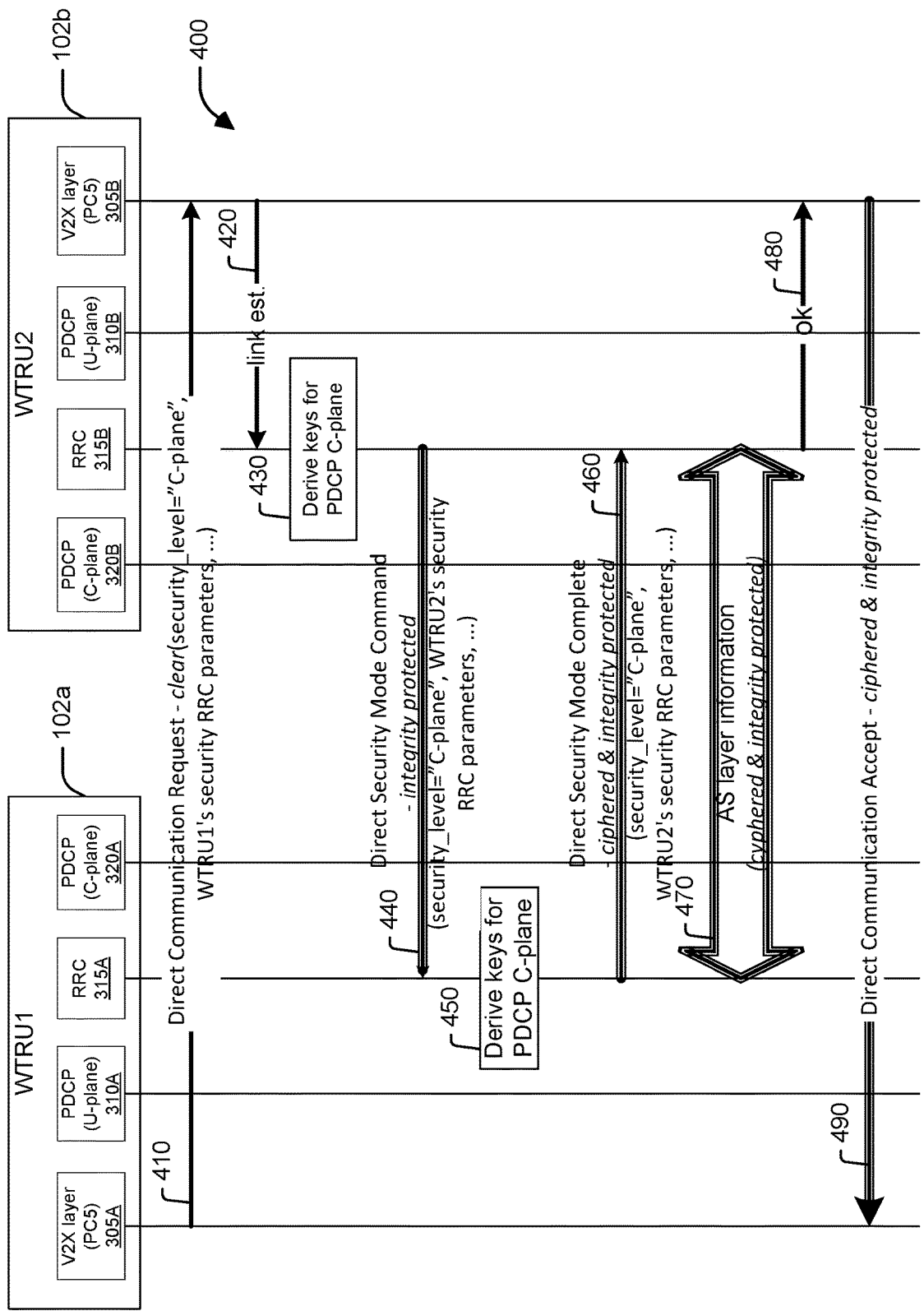
FIG. 4: PC5 Signaling over C-plane with Security Establishment at RRC Layer

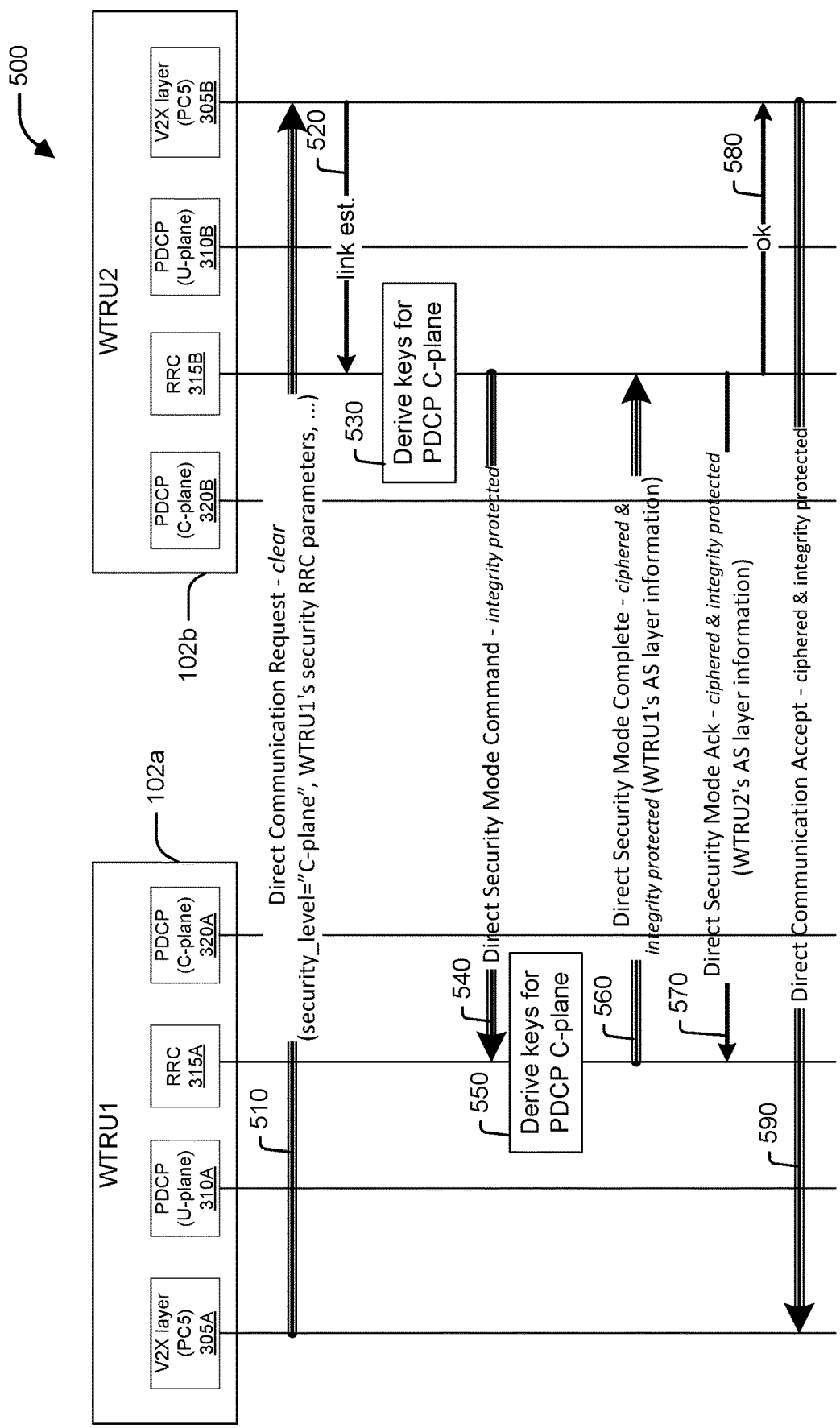
FIG. 5: Combined Security Establishment & AS Layer Information transfer at RRC Layer

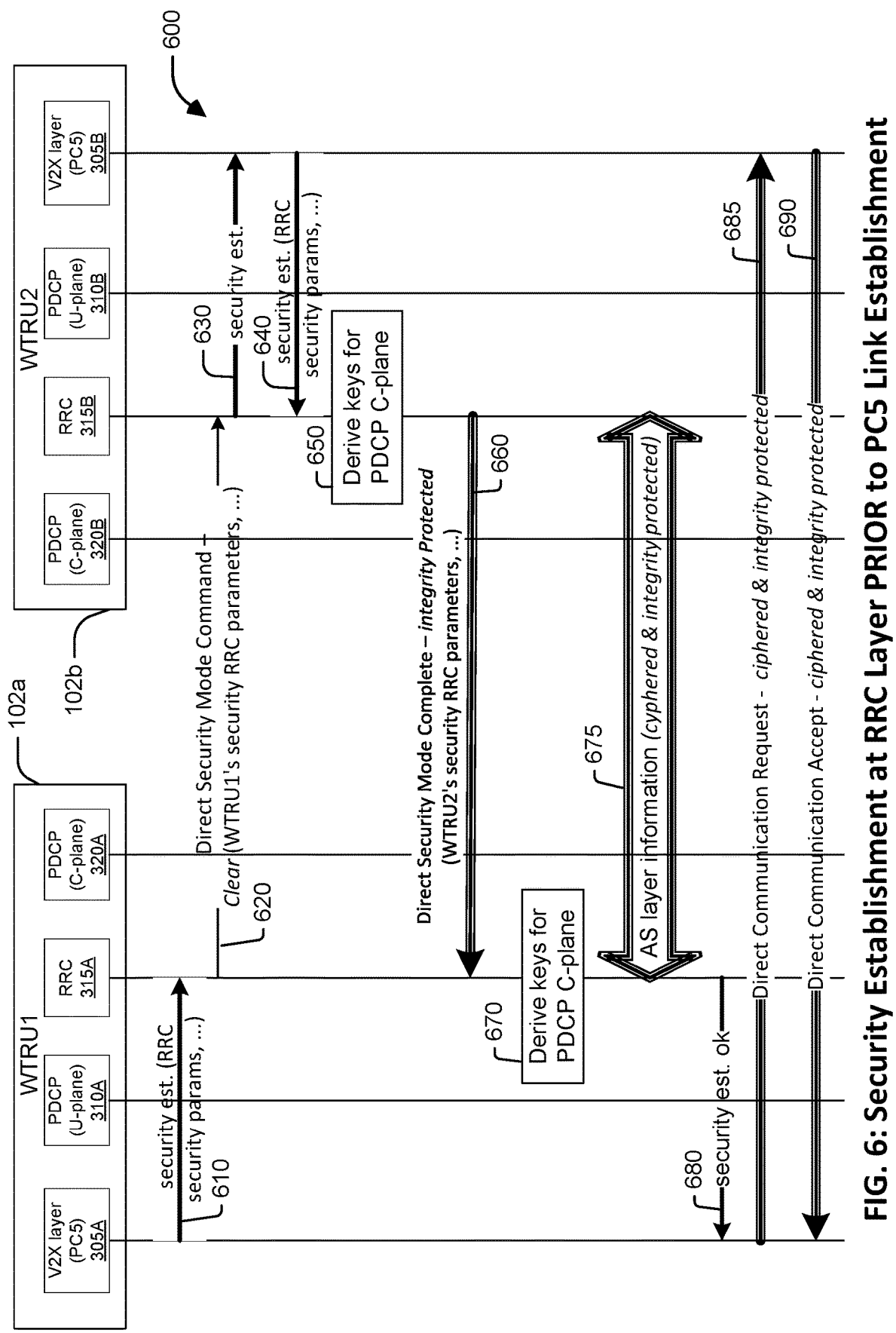
FIG. 6: Security Establishment at RRC Layer PRIOR to PC5 Link Establishment

FIG. 7

710: SEND, BY THE WTRU TO THE OTHER WTRU VIA A PC5 INTERFACE, A COMMUNICATION REQUEST INDICATING FIRST SECURITY INFORMATION FOR THE WTRU

↓

720: RECEIVE, BY THE WTRU FROM THE OTHER WTRU VIA THE PC5 INTERFACE, INFORMATION WHICH IS INTEGRITY PROTECTED INDICATING SECOND SECURITY INFORMATION FOR THE OTHER WTRU

↓

730: DERIVE, BY THE WTRU FROM THE INDICATED SECOND SECURITY INFORMATION, A FIRST SET OF SECURITY KEYS FOR COMMUNICATION VIA A FIRST LAYER USING THE U-PLANE AND A SECOND SET OF SECURITY KEYS FOR COMMUNICATION VIA A SECOND LAYER USING THE C-PLANE

↓

740: SEND, BY THE WTRU TO THE OTHER WTRU VIA THE PC5 INTERFACE, A MESSAGE THAT IS AT LEAST INTEGRITY PROTECTED USING THE DERIVED FIRST SET OF KEYS

FIG. 8

810: RECEIVE, BY THE WTRU FROM THE OTHER WTRU VIA A PC5 INTERFACE, A COMMUNICATION REQUEST INCLUDING A CONNECTION TYPE INDICATING A FIRST TYPE OF CONNECTION USING BOTH A USER PLANE (U-PLANE) AND A CONTROL PLANE (C-PLANE), AND FIRST SECURITY INFORMATION FOR THE OTHER WTRU

↓

820: DERIVE, BY THE WTRU FROM THE FIRST SECURITY INFORMATION, A FIRST SET OF SECURITY KEYS FOR COMMUNICATION VIA A FIRST LAYER USING THE U-PLANE AND A SECOND SET OF SECURITY KEYS FOR COMMUNICATION VIA A SECOND LAYER USING THE C-PLANE

↓

830: SEND, BY THE WTRU TO THE OTHER WTRU VIA THE PC5 INTERFACE, A SECURITY MODE COMMAND (SMC) REQUEST WHICH IS INTEGRITY PROTECTED INDICATING SECOND SECURITY INFORMATION FOR THE WTRU

↓

840: RECEIVE, BY THE WTRU FROM THE OTHER WTRU VIA THE PC5 INTERFACE, A MESSAGE THAT IS AT LEAST INTEGRITY PROTECTED USING THE DERIVED FIRST SET OF KEYS

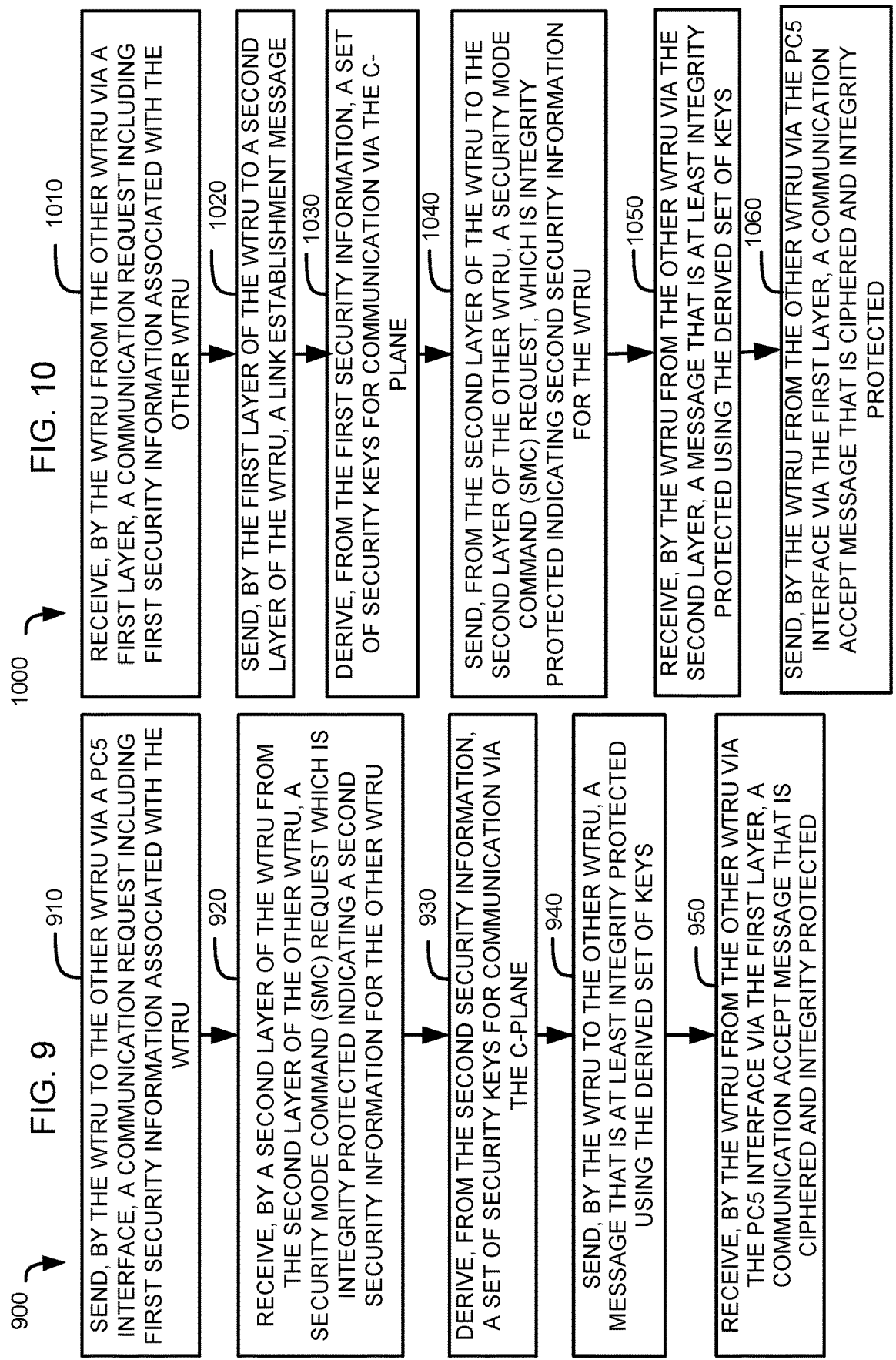

1110: RECEIVE, BY A FIRST LAYER OF THE WTRU FROM THE FIRST LAYER OF THE OTHER WTRU, A DIRECT SECURITY MODE (DSM) COMMAND INDICATING FIRST SECURITY INFORMATION FOR THE OTHER WTRU

1120: SEND, BY THE FIRST LAYER OF THE WTRU TO A SECOND LAYER OF THE WTRU, A SECURITY ESTABLISHMENT MESSAGE

1130: RECEIVE, BY THE FIRST LAYER OF THE WTRU FROM THE SECOND LAYER OF THE WTRU, THE FIRST SECURITY INFORMATION FOR THE WTRU

1140: SEND AND/OR RECEIVE, OVER THE C-PLANE BY THE FIRST LAYER OF THE WTRU, ACCESS STRATUM (AS) LAYER INFORMATION THAT IS CIPHERED AND INTEGRITY PROTECTED

1150: RECEIVE, BY THE WTRU FROM THE OTHER WTRU VIA A PC5 INTERFACE VIA THE C-PLANE, A COMMUNICATION REQUEST THAT IS CIPHERED AND INTEGRITY PROTECTED

1160: SEND, BY THE WTRU TO THE OTHER WTRU VIA A PC5 INTERFACE VIA THE C-PLANE, A COMMUNICATION ACCEPT MESSAGE THAT IS CIPHERED AND INTEGRITY PROTECTED

1210: RECEIVE, BY A FIRST LAYER OF THE WTRU FROM A SECOND FIRST LAYER OF THE OTHER WTRU, A SECURITY ESTABLISHMENT MESSAGE INCLUDING FIRST SECURITY INFORMATION FOR THE WTRU

1220: SEND, BY THE FIRST LAYER OF THE WTRU TO THE FIRST LAYER OF THE OTHER WTRU VIA A CONTROL PLANE, A DIRECT SECURITY MODE (DSM) COMMAND INDICATING THE RECEIVED FIRST SECURITY INFORMATION FOR THE WTRU

1230: RECEIVE, BY THE WTRU, A DSM COMPLETE INDICATING SECOND SECURITY INFORMATION FOR THE OTHER WTRU

1240: DERIVE, FROM THE SECOND SECURITY INFORMATION, A SET OF SECURITY KEYS FOR COMMUNICATION VIA THE C-PLANE

1250: SEND AND/OR RECEIVE, BY THE FIRST LAYER OF THE WTRU, ACCESS STRATUM (AS) LAYER INFORMATION THAT IS CIPHERED AND INTEGRITY PROTECTED

1260: SEND, BY THE WTRU TO THE OTHER WTRU VIA A PC5 INTERFACE VIA THE C-PLANE, A COMMUNICATION REQUEST THAT IS CIPHERED AND INTEGRITY PROTECTED

1270: RECEIVE, BY THE WTRU FROM THE OTHER WTRU VIA THE PC5 INTERFACE VIA THE C-PLANE, A COMMUNICATION ACCEPT MESSAGE THAT IS CIPHERED AND INTEGRITY PROTECTED

METHODS, APPARATUS AND SYSTEMS FOR SECURED RADIO RESOURCE CONTROL (RRC) SIGNALING OVER A PC5 INTERFACE FOR UNICAST COMMUNICATION

CROSS REFERENCE TO RELATED APPLICATIONS

This application is a $371 U.S. National Stage entry of PCT Application No. PCT/US2020/024443, filed Mar. 24, 2020, which is a non-provisional filing of, and claims priority from U.S. Provisional Application No. 62/824,001, filed Mar. 26, 2019, the contents of each of which are incorporated herein by reference as if fully set-forth herein in their respective entirety, for all purposes.

FIELD

Embodiments disclosed herein generally relate to wireless communications and, for example to methods, apparatus and systems for secured Radio Resource Control (RRC) signaling over a PC5 interface, for example, for unicast communication.

SUMMARY

Method, apparatus and systems are disclosed that may be implemented in a Wireless Transmit/Receive Unit (WTRU), for example, for unicast communication with another WTRU. One representative method includes sending, by the WTRU to the other WTRU via a PC5 interface, a communication request indicating first security information for the WTRU and receiving, by the WTRU from the other WTRU via the PC5 interface, information which is integrity protected indicating second security information for the other WTRU. The representative method also includes deriving, by the WTRU from the indicated second security information, a first set of security keys for communication via a first layer using the U-plane and a second set of security keys for communication via a second layer using the C-plane; and sending, by the WTRU to the other WTRU via the PC5 interface, a message that is at least integrity protected using the derived first set of keys.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein:

FIG. 2 is a diagram illustrating a representative procedure for security establishment at connection setup over PC5;

FIG. 3 is a diagram illustrating a representative procedure for combined security establishment provided at PC5 Signaling Layer (e.g., over the user plane (U-plane));

FIG. 4 is a diagram illustrating a representative procedure for a PC5 signaling over the control plane (C-plane) with security establishment at the RRC layer;

FIG. 5 is a diagram illustrating a representative procedure for a combined security establishment & AS layer information transfer at the RRC layer;

FIG. 6 is a diagram illustrating a representative procedure for security establishment at the RRC Layer prior to the PC5 Link establishment;

FIG. 7 is a flowchart illustrating a representative security procedure (e.g., for unicast communications by a WTRU with another WTRU);

FIG. 8 is a flowchart illustrating another representative security procedure (e.g., for unicast communications by a WTRU with another WTRU);

FIG. 9 is a flowchart illustrating a further representative security procedure (e.g., for unicast communications by a WTRU with another WTRU);

FIG. 10 is a flowchart illustrating an additional representative security procedure (e.g., for unicast communications by a WTRU with another WTRU);

FIG. 11 is a flowchart illustrating yet another representative security procedure (e.g., for unicast communications by a WTRU with another WTRU); and FIG. 12 is a flowchart illustrating a yet further representative security procedure (e.g., for unicast communications by a WTRU with another WTRU).

DETAILED DESCRIPTION

Example Networks for Implementation of the Embodiments

Certain embodiments may be implemented in autonomous and/or semi-autonomous vehicles, robotic vehicles, cars, IoT gear, any device that moves, or a WTRU or other communication devices, which, in turn, may be used in a communication network. The following section provides a description of some exemplary WTRUs and/or other communication devices and networks in which they may be incorporated.

Figure 1A:
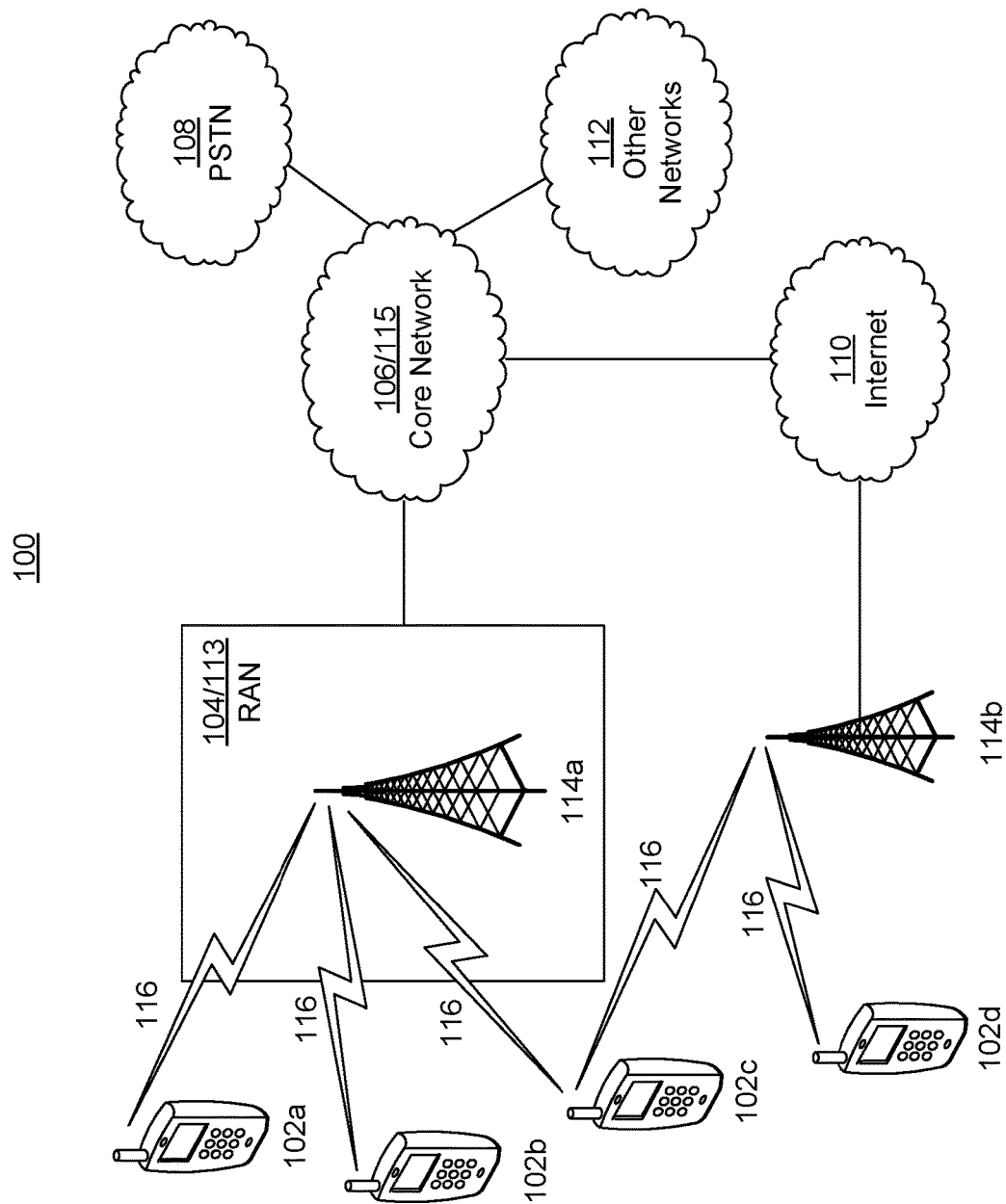
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (end), a Home Node B (HNB), a Home eNode B (HeNB), a gNB, a NR Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an end and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
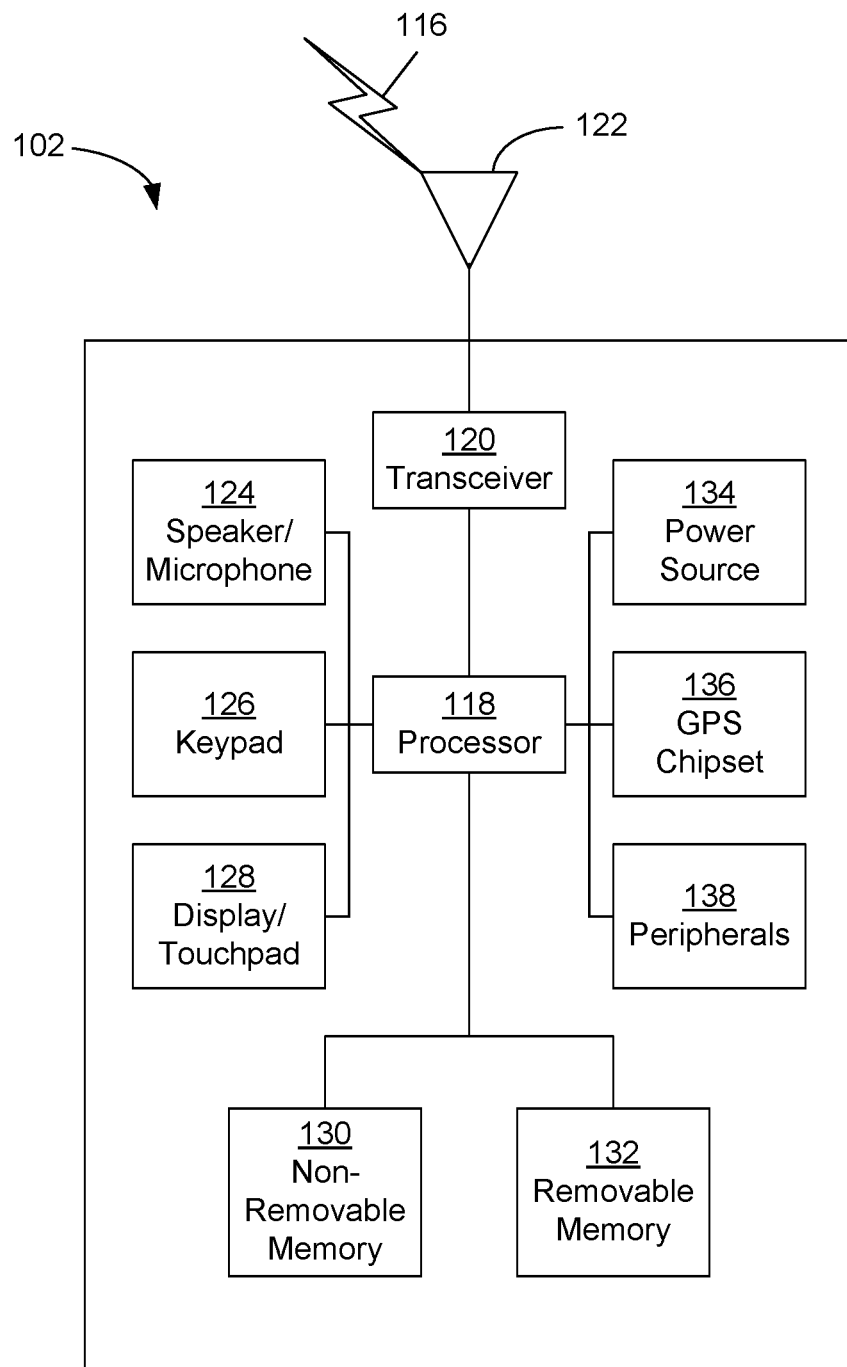
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
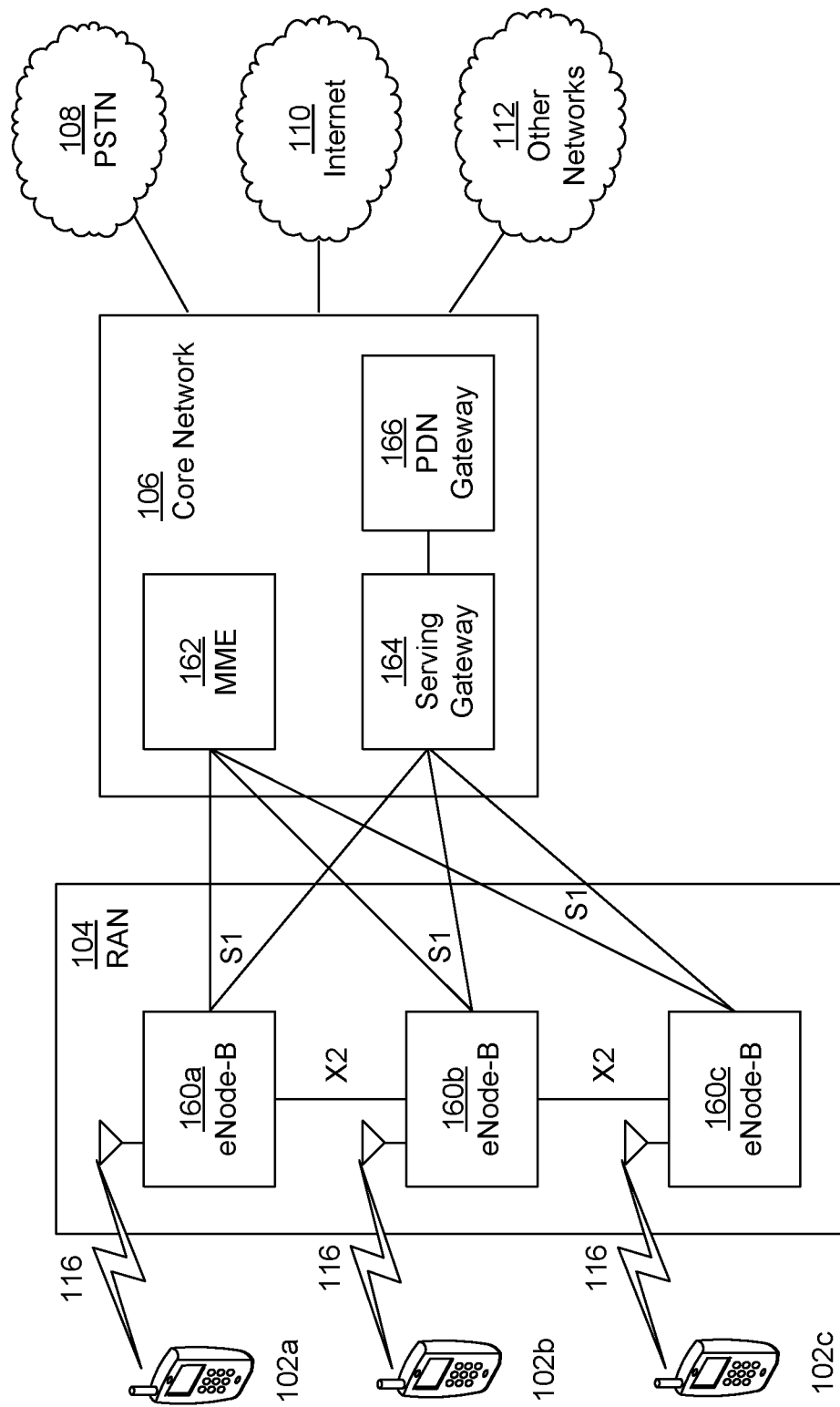
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and/or receive wireless signals from, the WTRU 102a.

Each of the eNode Bs 160a, 160b, 160c may be associated with a particular cell (not shown) and may be configured to handle radio resource management decisions, handover decisions, scheduling of users in the UL and/or DL, and the like. As shown in FIG. 1C, the eNode Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
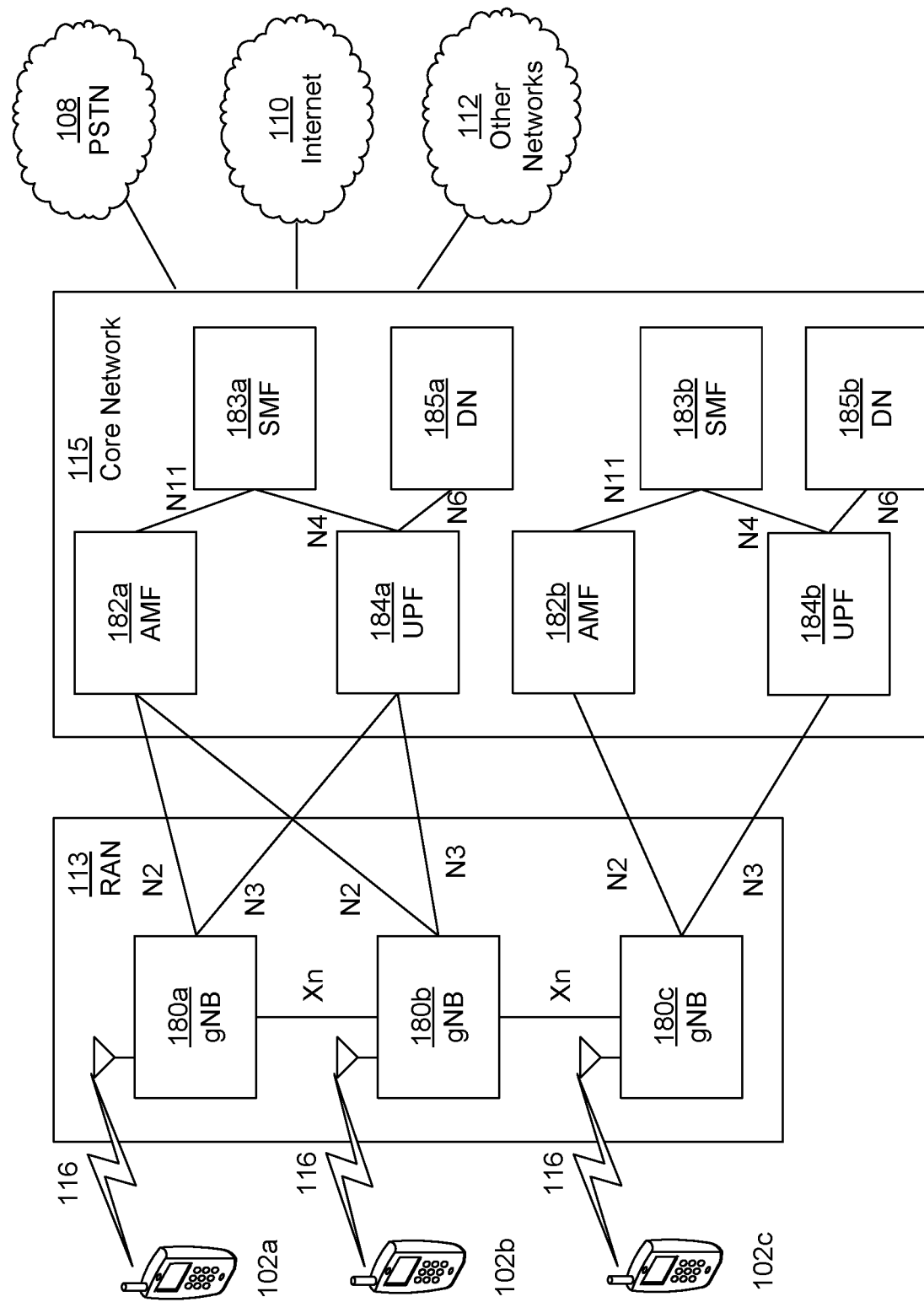
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode Bs 160a, 160b, 160c. For example, WTRUs 102a, 102b, 102c may implement DC principles to communicate with one or more gNBs 180a, 180b, 180c and one or more eNode Bs 160a, 160b, 160c substantially simultaneously. In the non-standalone configuration, eNode Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different Protocol Data Unit (PDU) sessions with different requirements), selecting a particular SMF 183a, 183b, management of the registration area, termination of Non-Access Stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency communication (URLLC) access, services relying on enhanced mobile (e.g., massive mobile) broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU 102 IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description, one or more, or all, of the functions described herein with regard to one or more of: WTRU 102a-d, Base Station 114a-b, eNode B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In certain representative embodiments, a WTRU 102 may establish security at an RRC level during unicast communication establishment over a PC5 interface by combining Direct Security Mode (DSM) operations from V2X/PC5 signaling and RRC layers together (e.g., over a U-plane).

In certain representative embodiments, a WTRU 102 may establish security at an RRC level during unicast communication establishment over a PC5 interface by combining DSM operations from V2X/PC5 signaling and RRC layers together over the C-plane.

In certain representative embodiments, the PC5 signaling and the security establishment may be handled over the C-plane. The DSM operations may be handled at the RRC layer. For example, the WTRU 102 may establish security at an RRC level during unicast communication establishment over the PC5 interface using the C-plane.

In certain representative embodiments, a combination of the security establishment and the transfer of AS layer information may be implemented during security establishment procedure over the C-plane by the RRC layer.

In certain representative embodiments, the V2X/PC5 signaling layer may trigger the establishment of the security protection at the RRC layer prior to the unicast communication establishment over the PC5 interface using the C-plane.

In certain representative embodiments, the initial RRC message sent prior to security establishment may be protected using a provisioned certificate.

Representative Procedure for Secured Link Establishment Over PC5 Interface

PC5 is the reference point (or interface) between the WTRUs 102 used by V2X Services for ProSe Direct Communication over the U-plane.

FIG. 2 is a diagram illustrating a representative procedure for security establishment at connection setup (e.g., the establishment of a secure one-to-one ProSe Direct communication).

Referring to FIG. 2, the representative procedure 200 may include, at 210, a first WTRU 102a sending a Direct Communication Request (DCR) to a second WTRU 102b. The DCR may include any of: (1) a Long Term ID; (2) one or more parameters related to long term negotiation; (3) a root key ID (e.g., $K_D$ ID); (4) one or more security capabilities of the first WTRU 102a; (5) a nonce (e.g., Nonce_1), and/or (6) a most significant byte (MSB) of an intermediate key ID (e.g., $K_{D\text{-}sess}$ ID), among others. At 220, direct authentication and key establishment may be initiated between the first WTRU 102a and the second WTRU 102b. A Direct Security Mode (DSM) Command message and/or a DSM Complete message may be exchanged. For example, at 230, the second WTRU 102b may send a DSM Command message to the first WTRU 102a. The DSM Command message may include any of: (1) the one or more security capabilities of the first WTRU 102a; (2) a nonce 2; (3) a least significant byte (LSB) of the intermediate key ID (e.g., $K_{D\text{-}sess}$ ID); (4) the MSB of the root key ID; and/or (5) a chosen algorithm (e.g., an indication of the selected security algorithm), among others. The DSM Command message may be integrity protected at the bearer layer with a new security context. At 240, after sending the DSM Command message, the second WTRU 102b may be ready to receive signaling and/or user plane traffic with the new security context. At 250, after receiving the DSM Command message, the first WTRU 102a may be ready to send and receive user plane and/or signaling data with the new security context. At 260, the first WTRU 102a may send a DSM Complete message to the second WTRU 102b. The DSM Complete message may include the LSB of the root key ID. The DSM Complete message may be integrity and/or confidentiality protected at the bearer layer with the new security context. At 270, the second WTRU 102b may send signaling and user plane traffic with the new security context and may delete any old security contexts.

Security establishment may take place during a unicast link setup procedure using or over the U-plane interface, (e.g., there is no C-plane involved on the unicast communication). Information may be exchanged between the WTRUs 102, over the PC5 interface, enabling WTRUs 102 to derive keys for integrity protection and/or encryption, for example prior to the link establishment (e.g., link establishment completion). The exchange may be referred to as the DSM exchange or DSM message exchange. The security protection may be applied by a Packet Data Convergence Protocol (PDCP) layer and may provide for and/or cover signaling and/or U-plane data (e.g., ProSe signaling and/or V2X application data) sent over the link.

A number of layers of keys may be used in various communications. For example, four different layers of keys may be used in a ProSe direct one-to-one communication including: (1) $K_D$ that may be a N-bit (e.g., 256 bit) root key that may be shared between the two entities communicating using ProSe Direct one-to-one communication; (2) $K_D$ ID that may be used to identify $K_D$; (3) $K_{D\text{-}sess}$ that may be an N-bit (e.g., 256 bit) key which may be the root of the actual security context that is being used to protect the transfer of data between the WTRUs 102. The keys that are used in the confidentiality and integrity algorithms may be derived from $K_{D\text{-}sess}$, as an intermediate key; (4) a 16-bit $K_{D\text{-}sess}$ ID that may identify the $K_{D\text{-}sess}$; (5) PEK and/or PIK (the ProSe Encryption Key (PEK) and/or the ProSe Integrity Key (PIK)) which may be session keys used in the chosen confidentiality and/or integrity algorithms, respectively, to protect ProSe direct one-to-one communication over the PC5 interface. PEK and/or PIK may be derived from the intermediate key $K_{D\text{-}sess}$.

In response to receiving a DIRECT_COMMUNICATION_REQUEST (DCR) message, the target WTRU 102 may initiate a direct security mode command procedure. The target WTRU 102 may generate a Least Significant Byte (LSB) of the $K_{D\text{-}sess}$ ID and may combine the LSB with the Most Significant Byte (MSB) of the $K_{D\text{-}sess}$ ID that the WTRU 102 received in the DIRECT_COMMUNICATION_REQUEST message.

The target WTRU 102 may generate a nonce value (e.g., a N-bit nonce_2 value and/or 128-bit nonce_2 value). With $K_D$, Nonce_1 (received in the DCR message) and/or Nonce_2, the target WTRU 102 may derive the intermediate key $K_{D\text{-}sess}$. The target WTRU 102 may send a DIRECT_SECURITY_MODE_COMMAND message to the initiating WTRU 102. The DIRECT_SECURITY_MODE_COMMAND message may include the Nonce_2 and the least significant bits (e.g., the least significant 8-bits) of the $K_{D\text{-}sess}$ ID.

After or upon receiving the DIRECT_SECURITY_MODE_COMMAND message, the initiating WTRU 102 may calculate the intermediate key $K_{D\text{-}sess}$ and/or the confidentiality and integrity keys (e.g., in the same way as the target WTRU 102). The initiating WTRU 102 may send a DIRECT_SECURITY_MODE_COMPLETE message to the target WTRU 102. The initiating WTRU 102 may form the $K_{D\text{-}sess}$ ID by combining the LSB of the $K_{D\text{-}sess}$ ID that the initiating WTRU 102 received in the DIRECT_SECURITY_MODE_COMMAND message and the MSB of the $K_{D\text{-}sess}$ ID that the initiating WTRU 102 has generated.

The intermediate key $K_{D\text{-}sess}$ may be the root of the security association. The intermediate key may be generated on or at the WTRUs 102. A portion of the $K_{D\text{-}sess}$ ID may locally identify a security context. For example, the initiating WTRU 102 may use the 8-bit MSB of the $K_{D\text{-}sess}$ ID to locate the intermediate key $K_{D\text{-}sess}$ and the target WTRU 102 may use the 8-bit LSB of the formed $K_{D\text{-}sess}$ ID to locate the intermediate key $K_{D\text{-}sess}$ for the link.

In certain representative embodiments, RRC (e.g., the C-plane) may be used as the signaling protocol over the PC5 interface, for example to exchange Access Stratum (AS) layer information (e.g., at least WTRU capabilities and/or an AS layer configuration). The exchange may be triggered during or after a unicast link establishment.

In certain representative embodiments, the WTRU capabilities and/or AS layer configuration may include and/or contain information (e.g., sensitive information) that may be security protected. The RRC protocol may be used to transfer the information over the PC5 interface such that security may be established by the PC5 signaling over the U-plane (e.g., but only over the U-plane radio bearer (RB) for example as set forth herein). In certain representative embodiments, the RRC messages sent over the C-plane may not be protected during the PC5 unicast link establishment.

For example, the AS layer information may be sent after the unicast link establishment and security establishment at the RRC level. The WTRU capabilities and/or AS layer configuration (sometime referred to as the WTRU capabilities & AS layer configuration) may then be sent. In certain representative embodiments, certain AS layer information may be needed/used to verify if the link may be established or not (e.g., if the desired QoS may be met or if WTRUs 102 may be allowed to establish a communication). For example, if the information is transferred after the link establishment and the QoS cannot be met, the link may be disconnected, which may be inefficient and/or may cause overhead in the network.

Representative Procedures to Protect AS Layer Information Transferred Using RRC over the PC5 Interface A first message (e.g., a Direct Communication Request from PC5 signaling) sent for the link establishment may be protected, for example, since the first message may contain and/or include sensitive information (e.g., PC5 signaling parameters) and, if sent over RRC layer, the first message may contain and/or include RRC parameters that may be required to be integrity protected and/or encrypted.

Representative Procedures to Protect the Initial RRC Message, for Example if Security is Established During the Link Establishment Although V2X is disclosed herein as an example of one type of communication (unicast communication and/or communication using a PC5 interface), it is contemplated that other types of communications are equally possible, e.g. communication associated with drones and other consumer devices such as wearables using direct device to device or ProSe communication. In case of ProSe communication, the procedures described herein by the V2X layer may be performed by the ProSe layer.

In certain representative embodiments, a secured transfer of WTRU capabilities & AS layer configuration information may be implemented, for example to enable communications using RRC over the PC5 interface. For example, the secured transfer may be provided for by any of: (1) combining the security establishment procedure from PC5 signaling and RRC layers together during unicast communication establishment to enable security protection of any data sent over the U-plane and/or C-plane, prior to the completion of the link establishment; (2) transmitting PC5 signaling over the C-plane and/or by triggering establishment of security protection at the RRC layer during unicast communication establishment; (3) triggering the establishment of security protection at the RRC layer prior to the initiation of the unicast communication establishment; and/or (4) replacing the ProSe signaling by the RRC protocol and/or by establishing security protection at the RRC layer, among others.

According to these embodiments, the security protection at the RRC layer may be obtained prior to the link establishment completion. The AS layer information (e.g. WTRU capabilities & AS layer configuration information) may be transferred once (e.g., after) the security is established and/or before completing the link establishment, for example to avoid the connection establishment followed by a quick disconnection, if or on condition that a determination that the link is not to be allowed.

For example, methods, apparatus, systems, procedures and operations may be implemented to provide protection of an initial RRC message (e.g., for transporting the first communication establishment message).

Representative Procedures for Combined Security Establishment for U-Plane and/or C-Plane In certain representative embodiments, V2X data and/or PC5 signaling may be sent over the U-plane and/or AS layer information may be sent over the C-plane. The WTRU 102 may initiate the PC5 link establishment and may include an indication (e.g., a type of connection establishment—"connection_type") specifying on to which layer security is or may be supported, used and/or required (e.g., "U-Plane only" or "U-plane+C-plane"). The WTRU 102 may include parameters for security establishment at V2X/PC5 signaling and, if "U-plane+C-plane" security may be or is supported, used and/or required, parameters for the security establishment at the RRC layer may be included such that, for example DSM operations from the V2X/PC5 signaling and the RRC layers may be combined. As a result, 2 different sets of keys may be derived on the WTRU 102 including for example a first set of one or more keys that may be applied over the U-plane (e.g., for V2X/PC5 signaling) and a second set of one or more keys that may be applied over the C-plane (e.g., for RRC signaling).

The first and second sets of keys may be associated to the same session identifier (e.g., $K_{D\text{-}sess}$ ID). A $K_{D\text{-}sess}$ ID may be obtained at the PC5 signaling layer and may be used to locate the PC5 signaling security context for the communication link. The $K_{D\text{-}sess}$ ID may be passed to the RRC layer, which may derive one or more RRC associated keys (e.g., its own keys) and may associate the RRC associated keys with the same $K_{D\text{-}sess}$ ID that may be used to locate the PC5 signaling & RRC security contexts.

Two set of security parameters (e.g., different sets of parameters) may be sent in a single DSM message (e.g., different list of supported algorithms), for example to enable different levels of security to be applied at the C-plane and the U-plane. For example, the confidentiality protection may be negotiated between the WTRUs 102, for example to apply (e.g., only apply) the confidentiality protection at the U-plane and/or integrity & confidentiality protection at the C-plane (e.g., while the integrity & confidentiality protection are applied at the C-plane).

Examples of security parameters that may be exchanged between WTRUs 102 for the generation of a key at the PC5 signaling and/or the RRC layers may include any of:

(1) from a first WTRU 102a (e.g., WTRU1), (i) User Info 1, (ii) Nonce1, (iii) WTRU security capabilities (including for example a list of supported algorithms), (iv) an MSB of the KD-sess ID, and/or (v) an LSB of KD ID information element (IE), among others; and/or (2) from a second WTRU 102b (e.g., WTRU2), (i) User Info 2, (ii) Nonce2, (iii) WTRU security capabilities (including for example a list of supported algorithms and/or selected algorithm), (iv) an LSB of the $K_{D\text{-}sess}$ ID, and/or (v) an MSB of KD ID IE, among others.

As set forth herein, messages sent over or using the U-plane are shown in the FIGS, as double lines and messages sent over the C-plane are shown as triple lines. It is also contemplated that PC5-S messages are alternatively sent over a C-plane (e.g., using a signaling radio bearer (SRB)). In that case, the same principle of separation of the security keys derived for RRC and PC5-S as illustrated below is applied (e.g., across separate SRBs).

FIG. 3 is a diagram illustrating a representative procedure for combined security establishment provided at the PC5 signaling layer and/or over the U-plane. Referring to FIG. 3, a representative procedure 300 may include a first WTRU 102a (e.g., WTRU1) and a second WTRU 102b (e.g., WTRU2) each including a protocol stack (e.g., complementary protocol stacks) having a plurality of layers/entities. Each stack (not shown) may enable data communication via a user plane (U-plane) interface, and/or control signaling via either the U-plane interface or a C-plane interface. Each stack may include, for example: (1) a V2X layer/sublayer that may enable a PC5 interface; (2) a Packet Data Convergence Protocol (PDCP) layer and/or (3) a MAC/RRC layer (e.g., an L2 layer). The V2X layer/sublayer of the first WTRU 102a may include a V2X entity 305A and the V2X layer/sublayer of the second WTRU 102b may include a V2X entity 305B, for example to enable V2X/PC5 signaling between the first and second WTRUs 102. The PDCP layer of the first WTRU 102a may include a PDPC entity 310A/320A which may include a PDPC U-plane portion 310A and/or a PDPC control plane (C-plane) portion 320A. The PDCP layer of the second WTRU 102b may include a PDPC entity 310B/320B which may include a PDPC U-plane portion 310B and/or a PDPC C-plane portion 320B. The MAC/RRC layer of the first WTRU 102a may include a MAC/RRC entity 315A and the MAC/RRC layer of the second WTRU 102b may include a MAC/RRC entity 315B to enable RRC signaling between the first and second WTRUs 102a and 102b.

At 330, a first WTRU 102a may initiate PC5 link establishment using a PC5-S message (e.g., a Direct Communication Request (DCR) message) sent from the V2X layer/entity 305A of the first WTRU 102a to the V2X layer/entity 305B of the second WTRU 102b via a PC5 interface (e.g., using PC5 signaling). The DCR message may include: (1) a "connection_type" indication, for example, specifying that "U-plane+C-plane" security is used/required (e.g., indicating a security level of "U-plane+C-plane" security). For example, the message may include security parameters for a combined security establishment procedure at the V2X and MAC/RRC layers/entities 305/315 (e.g., parameters such as one or more supported algorithms for PC5 and RRC, and/or one or more nonces (e.g., nonce_1s) for the PC5 and the RRC, among others) such that the DSM operations from V2X layer/entities 305 via PC5 signaling and from the MAC/RRC layer/entities 315 via RRC signaling may be combined. In certain representative embodiments the DCR message may include a connection type/security level indicator, for example indicating a combined security/connection type for the U-plane and the C-plane, the PC5 signaling parameters for the first WTRU 102a and the security RRC parameters for the first WTRU 102a.

At 335, the V2X layer/entity 305B of the second WTRU 102b via PC5 signaling may use information of the first WTRU 102a received from the first WTRU 102a via the DCR message and its own information to derive keys (e.g., one or more U-plane keys) to be used by the PDCP entity 310B/320B (e.g., after configuration of the selected algorithm and/or keys by the V2X layer/entity 305B) for a bearer of the U-plane. At 340, the V2X layer/entity 305B of the second WTRU 102b via signaling (e.g., interlayer signaling or PC5 signaling) may inform the MAC/RRC layer/entity 315B of the second WTRU 102b (e.g., may send a link establishment message or signaling to the MAC/RRC layer/entity 315B) that link establishment is ongoing/supported and on condition that the "connection type" of service level indication is set to "U-plane+C-plane", the V2X layer/entity 305B of the second WTRU 102b via PC5 signaling may provide parameters related to RRC security establishment (e.g., parameters received from the first WTRU 102a and parameters locally provisioned by the second WTRU 102b).

At 345, the MAC/RRC layer/entity 315B of the second WTRU 102b, using the parameters received from the V2X layer/entity 305B of the second WTRU 102b may derive another set of one or more keys for the MAC/RRC layer security protection (e.g., used for the C-plane). The derived keys may be passed to the PDCP entity 320B of the second WTRU 102b handling security on the C-plane (e.g., bearers of the C-plane). At 350, the V2X layer/entity 305B may provide PC5 signaling to the V2X layer/entity 305A and may initiate a security establishment procedure. The security establishment procedure may include PC5 signaling of one or more parameters for security establishment at the V2X layer/entity 305B, (for example, the parameters may include one or more selected algorithms and/or nonces (e.g., nonce_2 for the PC5)) and/or another set of one or more parameters for security establishment at the MAC/RRC layer/entity 315B, (for example, one or more selected algorithms and/or nonces (e.g., nonce_2 for the MAC/RRC layer/entity 315B) may be specified in a single DSM Command message. The SMC Request message may be integrity protected and/or may be sent over the U-plane. In certain representative embodiments the SMC message may include a security level indicator, for example indicating combined security for the U-plane and the C-plane, the PC5 signaling parameters for the second WTRU 102b and the security RRC parameters for the second WTRU 102b.

At 355, the V2X layer/entity 305A of the first WTRU 102a via PC5 signaling may receive parameters from a peer WTRU (e.g., the second WTRU 102b) and may derive one or more keys for the PDCP layer/entity 310A/320A handling the bearer (e.g., of the U-plane) prior to the link establishment completion. At 360, the V2X layer/entity 305A of the first WTRU 102a via interlayer signaling and/or PC5 signaling may inform the MAC/RRC layer/entity 315A of the first WTRU 102a that the link establishment (e.g., security establishment) is ongoing/supported and may provide one or more parameters related to the RRC security establishment (e.g., one or more parameters received from the second WTRU 102b and/or one or more parameters locally provisioned by the first WTRU 102a). At 365, the MAC/RRC layer/entity 315A may derive another set of one or more keys for C-plane protection, prior to the link establishment completion (e.g., security establishment completion) and/or transmission of the first WTRU capabilities & AS layer configuration over or using RRC signaling. The derived keys may be passed to the PDCP entity handling security on the C-plane (e.g., the bearers of the C-plane). At 370, the V2X layer/entity 305A via PC5 signaling may complete the security establishment, for example by sending a single DSM Complete message that may be ciphered and/or integrity protected over or using the U-plane. In certain representative embodiments the DSM Complete message may include a security level indicator, for example indicating combined security for the U-plane and the C-plane, the PC5 signaling parameters for the second WTRU 102b and the security RRC parameters for the second WTRU 102b.

At 375, the V2X layer/entity 305B of the second WTRU 102b may signal to the MAC/RRC layer/entity 315B of the second WTRU 102b to inform the MAC/RRC layer/entity 315B of the security establishment completion.

At 380, the MAC/RRC layer/entity 315A of the first WTRU 102a and the MAC/RRC layer/entity 315B of the second WTRU 102b may transfer/exchange (e.g., securely transfer/securely exchange) the WTRU capabilities & AS layer configuration information of the first and second WTRUs 102a and 102b over or using the C-plane (e.g., via RRC signaling), prior to the link establishment completion. Operations 385A/390A and 385B/390B may be alternative operations. At 385A, on condition that the WTRU capabilities & AS layer configuration information of the first and second WTRUs 102a 102b does not lead to a failure of the link establishment procedure, the MAC/RRC layer/entity 315B may send a signal (e.g., an interlayer or PC5 signal to the V2X layer/entity 305B to inform the V2X layer/entity 305B of successful link establishment. At 390A, the V2X layer/entity 305B may send an accept message (e.g., a Direct Communication Accept message) that may be ciphered and/or integrity protected over or using the U-plane to the V2X layer/entity 305A of the first WTRU 102a (e.g., the source WTRU) to complete the link establishment procedure. After, the V2X layer/entities 315 may send (e.g., now send) security protected messages over the U-plane.

Alternatively, at 385B, on condition that the WTRU capabilities & AS layer configuration information of the first and second WTRUs 102a 102b leads to a failure of the link establishment procedure, the MAC/RRC layer/entity 315B may send a signal (e.g., an interlayer or PC5 signal to the V2X layer/entity 305B to inform the V2X layer/entity 305B of an unsuccessful link establishment (e.g., failure of the link establishment procedure). At 390B, on condition that a failure indication has been received from the MAC/RRC layer/entity 315B of the second WTRU 102b, the V2X layer/entity 305B of the second WTRU 102b may reject the link establishment and, thus, the V2X layer/entity 305B of the second WTRU 102b cannot send data. The V2X layer/entity 305B may send a reject message (e.g., a Direct Communication Reject message) that may be ciphered and/or integrity protected over or using the U-plane to the V2X layer/entity 305A of the first WTRU 102a (e.g., the source WTRU).

Other Representative Combined Security Establishment Procedures at PC5 Signaling Layer—Over the C-Plane In certain representative embodiments, PC5 signaling may be sent over the C-plane and V2X data may be sent over the U-plane. In this case, the security establishments for the U-plane and the C-plane may be combined. Referring to FIG. 3, the same actors and operations may apply (e.g., the DSM procedure may be executed (e.g., still executed) at the V2X/PC5 signaling layer and/or the DSM messages and PC5 signaling messages may be sent over the C-plane (in this case the double lined arrows would instead be represented by triple lined arrows).

Representative PC5 Signaling Procedures Over the C-Plane with Security Establishment at the RRC Layer In certain representative embodiments, the PC5 signaling and/or the security establishment may be handled over the C-plane. The link establishment may be handled at the PC5 signaling layer and the security establishment (e.g., the DSM procedure) may be handled at the RRC layer. The PC5 signaling layer may trigger the establishment of the security protection at the RRC layer during a unicast communication establishment. The C-plane may be protected prior to the link establishment completion. The PC5 signaling may be sent over the C-plane and may be protected (for example, except for the initial DCR message which may be sent in the clear, for example without being protected).

FIG. 4 is a diagram illustrating a representative procedure for PC5 signaling over the C-plane with security establishment at the RRC layer. Referring to FIG. 4, the representative procedure 400 may include, at 410, a first WTRU 102a initiating PC5 link establishment using a message (e.g., a Direct Communication Request (DCR) message) sent from the V2X layer/entity 305A of the first WTRU 102a to the V2X layer/entity 305B of the second WTRU 102b via a PC5 interface (e.g., using PC5 signaling). The DCR message may include: (1) a connection_type/security level indication, for example, specifying that C-plane security is used/required. For example, the message may include security parameters for a C-plane security establishment procedure at the V2X and MAC/RRC layers/entities 305/315 (e.g., parameters such as one or more supported algorithms for C-plane security and/or one or more nonce_1s, among others). In certain embodiments, the DCR message may be sent over the U-plane and may be sent in the clear.

At 420, the V2X layer/entity 305B of the second WTRU 102b via signaling (e.g., interlayer signaling or PC5 signaling) may inform the MAC/RRC layer/entity 315B of the second WTRU 102b (e.g., may send a link establishment message or signaling to the MAC/RRC layer/entity 315B) that link establishment is ongoing/supported and on condition that the connection_type/security level indication is set to "C-plane", the V2X layer/entity 305B of the second WTRU 102b via interlayer signaling or PC5 signaling may provide parameters related to C-plane (e.g., RRC) security establishment (e.g., parameters received from the first WTRU 102a and parameters locally provisioned by the second WTRU 102b). At 430, for example, the MAC/RRC layer/entity 315B of the second WTRU 102b may use information of the first WTRU 102a via the DCR message and its own information to derive keys (e.g., one or more C-plane keys) to be used by the PDCP entity 310B/320B for the C-plane.

At 440, the MAC/RRC layer/entity 315B of the second WTRU 102b may send a DSM Command message to the MAC/RRC layer/entity 315A of the first WTRU 102a. The DSM Command message may be integrity protected and may include any of: (1) a connection type/security level indication specified as "C-plane"; and/or (2) one or more security parameters (e.g., RRC) security parameters of the second WTRU 102b. At 450, after receiving the DSM Command message, the MAC/RRC layer/entity 315A of the first WTRU 102a may derive one or more keys (e.g., security keys) for use by the PDCP C-plane. At 460, the MAC/RRC layer/entity 315A of the first WTRU 102a may send a DSM Complete message to the MAC/RRC layer/entity 315B of the second WTRU 102b. The DSM Complete message may be ciphered and/or integrity protected and may include any of: (1) a connection type/security level indication, for example, specified as "C-plane"; and/or (2) one or more security parameters (e.g., RRC) security parameters of the second WTRU 102b. At 470, Access Stratum (AS) layer information may be exchanged between the MAC/RRC layers/entities 315A and 315B of the first and second WTRUs 102a and 102b. At 480, on condition that the WTRU capabilities & AS layer configuration information of the first WTRU 102a and second WTRUs 102b does not lead to a failure of the link establishment procedure, the MAC/RRC layer/entity 315B may send a signal (e.g., an interlayer or PC5 signal to the V2X layer/entity 305B of the second WTRU 102b to inform the V2X layer/entity 305B of a successful link establishment. At 490, the V2X layer/entity 305B may send an accept message (e.g., a Direct Communication Accept message) that may be ciphered and/or integrity protected to the V2X layer/entity 305A of the first WTRU 102a (e.g., the source WTRU) to complete the link establishment procedure. The MAC/RRC layer/entities 315 may send (e.g., now send) security protected messages over the C-plane.

In certain embodiments, the V2X data may be sent over the C-plane and/or over the U-plane. In the case in which the U-plane is used, security may be established over the U-plane in addition to or in lieu of such security at the C-plane. For example, security may be used over the C-plane and the U-plane concurrently, overlapping in time and/or at the same time. The U-plane and/or C-plane security establishments may be combined. In certain representative embodiments, the security establishment procedure may be handled at the MAC/RRC layer, a higher layer and/or a lower layer, among others. In certain representative embodiments, the PC5 signaling security parameters (e.g., selected algorithm, and/or nonce_2 for PC5, among others) sent to the first WTRU 102a using the DSM Command message may need to be and/or may be passed to the PC5 signaling layer (e.g., by the MAC/RRC layer) so that one or more keys for the PDCP U-plane may be derived at or on the first WTRU 102a.

In FIG. 4, messages/signals sent over the C-plane are shown, as triple lines.

Representative Procedures for Combined Security Establishment and Information Transfer FIG. 5 is a diagram illustrating a representative procedure for combined security establishment & AS layer information transfer (e.g., performed at the MAC/RRC layer).

Referring to FIG. 5, the procedure 500 may include, at 510, a first WTRU 102a initiating PC5 link establishment using a message (e.g., a DCR message) sent from the V2X layer/entity 305A of the first WTRU 102a to the V2X layer/entity 305B of the second WTRU 102b via a PC5 interface (e.g., using PC5 signaling). The DCR message may include: (1) a connection_type/security level indication, for example, specifying that C-plane security is used/required and/or RRC security parameters of the first WTRU 102a. For example, the message may include security parameters for a C-plane security establishment procedure at the V2X and/or RRC layers/entities 305/315 (e.g., parameters such as one or more supported algorithms for C-plane security and/or one or more nonces, among others). In certain embodiments, the DCR message may be sent over the C-plane and/or may be sent in the clear.

At 520, the V2X layer/entity 305B of the second WTRU 102b via signaling (e.g., interlayer signaling or PC5 signaling) may inform the MAC/RRC layer/entity 315B of the second WTRU 102b (e.g., may send a link establishment message or signaling to the MAC/RRC layer/entity 315B) that link establishment is ongoing/supported and on condition that the connection_type/security level indication is set to "C-plane", the V2X layer/entity 305B of the second WTRU 102b via interlayer signaling or PC5 signaling may provide parameters related to C-plane (e.g., RRC) security establishment (e.g., parameters received from the first WTRU 102a and parameters locally provisioned by the second WTRU 102b). At 530, for example, the MAC/RRC layer/entity 315B of the second WTRU 102b may use information of the first WTRU 102a send via the DCR message and its own information to derive keys (e.g., one or more C-plane keys) to be used by the PDCP entity 310B/320B for the C-plane.

At 540, the MAC/RRC layer/entity 315B of the second WTRU 102b may send a Direct Security Mode (DSM) Command message to the MAC/RRC layer/entity 315A of the first WTRU 102a. The DSM Command message may be integrity protected. At 550, after receiving the DSM Command message, the MAC/RRC layer/entity 315A of the first WTRU 102a may derive one or more keys (e.g., security keys) for the PDCP C-plane. At 560, the MAC/RRC layer/entity 315A of the first WTRU 102a may send a DSM Complete message to the MAC/RRC layer/entity 315B of the second WTRU 102b. The DSM Complete message may be ciphered and/or integrity protected and may include AS layer information of the first WTRU 102a. At 570, the MAC/RRC layer/entity 315B of the first WTRU 102b may send a DSM Acknowledgement (ACK) to the MAC/RRC layer/entity 315A of the first WTRU 102a. The DSM ACK may be ciphered and/or integrity protected and may include AS layer information of the second WTRU 102b.

At 580, on condition that the AS layer information of the first WTRU 102a does not lead to a failure of the link establishment procedure, the MAC/RRC layer/entity 315B may send a signal (e.g., an interlayer or PC5 signal) to the V2X layer/entity 305B of the second WTRU 102b to inform the V2X layer/entity 305B of a successful link establishment. At 590, the V2X layer/entity 305B may send an accept message (e.g., a Direct Communication Accept message) that may be ciphered and/or integrity protected over or using the C-plane to the V2X layer/entity 305A of the first WTRU 102a (e.g., the source WTRU) to complete the link establishment procedure. The MAC/RRC layer/entities 315, for example, may send (e.g., now send) security protected messages over the C-plane.

In FIG. 5, messages/signals sent over the C-plane are shown, as triple lines.

The handling of the security establishment at the MAC/RRC layer may enable the combination of the security establishment and the transfer of the AS layer information (e.g., the WTRU capabilities, AS configuration information, SRB/DRB (e.g., Sidelink SRB/DRB) setup/configuration parameters & logical channel information). The AS layer information may be sensitive information and may be or is to be ciphered and/or integrity protected. The "DSM Command" may be integrity protected and may or may not be ciphered. The DSM Command may be used to transport sensitive information on condition that integrity protection (e.g., only integrity protection) is used and/or required. If ciphering is used and/or required in addition to integrity protection, a DSM Command may not be used. In certain representative embodiments, a procedure may be implemented that may be used when ciphering and integrity protection are used/required. The security establishment procedure may be re-used and/or modified for this purpose, e.g., the AS layer information, may be carried on the "DSM Complete" message and a new message "DSM Ack" may be added.

It is contemplated that FIG. 5 focuses on the combination of security establishment procedure and the AS layer information transfer such that parameters about the security establishment as shown on other figures are not repeated, for brevity.

Representative Procedures for PC5 Signaling Over the C-Plane after Security Establishment at the RRC Layer FIG. 6 is a diagram illustrating a representative procedure for security establishment at the RRC layer prior to the PC5 link establishment.

Referring to FIG. 6, representative procedure 600 may include, at 610, a first WTRU 102a initiating PC5 link establishment using a message (e.g., a security establishment message) using interlayer and/or PC5 signaling. The message may be sent from the V2X layer/entity 305A of the first WTRU 102a to the MAC/RRC layer/entity 315A or the first WTRU 102a. The message may include the RRC security parameters of the first WTRU 102a. At 620, the MAC/RRC layer/entity 315A of the first WTRU 102a may send a request message (e.g., a Direct Security Mode (DSM) Command message) from the MAC/RRC layer/entity 315A of the first WTRU 102a to the MAC/RRC layer/entity 315B of the second WTRU 102b. The DSM Command message may be sent in the clear (e.g., without security protection). The DSM Command message may include the RRC security parameters of the first WTRU 102a. For example, the message may include security parameters for a C-plane security establishment procedure (e.g., parameters such as one or more supported algorithms for C-plane security and/or one or more nonces, among others). The message may be protected as described herein (e.g., signed with a provisioned certificate). At 630, the MAC/RRC layer/entity 315B of the second WTRU 102b may send a message (e.g., a security establishment message) using interlayer and/or PC5 signaling to the V2X layer/entity 305B of the second WTRU 102b. At 640, the V2X layer/entity 305B of the second WTRU 102b may send a message (e.g., a security establishment message) to the MAC/RRC layer/entity 315B of the second WTRU 102b. The message may include the RRC security parameters, for example of the first WTRU 102a sent via the DSM Command message and RRC security parameters of the second WTRU 102b. For example, in certain embodiments, the V2X layer/entity 305B may obtain the RRC security parameters and may pass these parameters to the MAC/RRC layer/entity 315B, via interlayer communication and/or the V2X layer/entity 305B may derive the RRC security parameters and may pass these parameters to the MAC/RRC layer/entity 315B, via the interlayer communication.

At 650, the MAC/RRC layer/entity 315B of the second WTRU 102b may use information of the first WTRU 102a and its own information to derive keys (e.g., one or more C-plane keys) to be used by the PDCP entity 310B/320B for the C-plane.

At 660, the MAC/RRC layer/entity 315B of the second WTRU 102b may send a DSM Complete message to the MAC/RRC layer/entity 315A of the first WTRU 102a. The DSM Complete message may be integrity protected and may include the RRC security parameters of the second WTRU 102b. At 670, after receiving the DSM Complete message, the MAC/RRC layer/entity 315A of the first WTRU 102a may derive one or more keys (e.g., security keys) for the PDCP C-plane. At 675, the MAC/RRC layer/entity 315A of the first WTRU 102a and the MAC/RRC layer/entity 315B of the second WTRU 102b may exchange AS layer information over the C-plane. The AS layer information may be ciphered and/or integrity protected. At 680, on condition that the AS layer information does not lead to a failure of the link establishment procedure, the MAC/RRC layer/entity 315A may send a signal (e.g., an interlayer or PC5 signal to the V2X layer/entity 305A of the first WTRU 102a to inform the V2X layer/entity 305A of a successful link establishment. At 685, the V2X layer/entity 305A may send a request message (e.g., a Direct Communication Request message) that may be ciphered and/or integrity protected over or using the C-plane to the V2X layer/entity 305B of the second WTRU 102b to request the link establishment procedure. At 690, the V2X layer/entity 305B may send an accept message (e.g., a Direct Communication Accept message) that may be ciphered and/or integrity protected over or using the C-plane to the V2X layer/entity 305A of the first WTRU 102a to accept the link establishment procedure. The MAC/RRC layer/entities 315 may send (e.g., now send) security protected messages over the C-plane.

For example, the PC5 signaling and the security establishment may be handled over the C-plane. The link establishment may be handled at the PC5 signaling layer and the security establishment (e.g., the DSM procedure) may be handled at the RRC layer. The difference, in comparison of this embodiment to previous embodiments, may be that the PC5 signaling layer may trigger the establishment of the security protection at the RRC layer prior to the unicast communication establishment. The C-plane may be protected prior to the start of the link establishment. PC5 signaling may be sent over the C-plane and may be protected.

It is contemplated that PC5 signaling may be sent over the U-plane following the security establishment and AS layer information transfer over the C-plane.

In operations 610 and 640, the RRC security parameters (e.g., RRC security capabilities) may be obtained from the V2X layer 305, which may be provisioned with the RRC security parameters. The initial RRC message at operation 620 is illustrated as being sent in the "clear" (e.g., without being ciphered and/or integrity protected). The initial RRC message may be protected as described herein (e.g. signed with a provisioned certificate).

Representative Procedure for RRC Protocol Replacing PC5 Signaling

In certain representative embodiments, the PC5 signaling may be replaced with an RRC protocol for the unicast link establishment. For example, the V2X layer may trigger the RRC layer to establish the communication and establish the security. The V2X layer may provide parameters indicating the connection type, (e.g., "U-plane+C-plane" or "C-plane only", among others). The RRC layer may be responsible to setup the C-plane and/or the U-plane.

Representative Procedure for Initial RRC Message Protection

The initial RRC message that is sent in any of the scenarios described herein is shown as being sent in the "clear" (e.g., without being security protected). The reason for the message being sent in the clear is that the security may be established after the transmission of this initial message such that the keys are not yet derived. The initial message, however, may contain or include RRC parameters that are sensitive and that may need to be integrity protected and/or encrypted. To overcome sensitive information/parameters being exposed, any of the following may be implemented in addition to or in lieu of other disclosed embodiments:

(1) using provisioned certificates for protection of the initial RRC message; (For example, the WTRUs 102 (e.g., each WTRU 102a and 102b) may be provisioned with certificates for security protection, e.g., related to V2X communications. It is contemplated to use a certificate for the protection of the initial RRC message, e.g., the WTRU 102 may sign the DCR message with its certificate. Once (e.g., after) the initial RRC message (e.g., the DCR message) is sent, the peer WTRU 102b may check the message signature using a provisioned root certificate. The peer WTRU 102b may derive its session keys, and may integrity protect the next message to be sent such that the initial RRC message (e.g., only the initial RRC message) is to be or needs to be protected using the certificate); and/or (2) using information from the gNB 180 for protection of the initial RRC message; (For example, the WTRU 102a and the peer WTRU 102b may be served by the same gNB 180 and/or may be in a common coverage area associated with a gNB 180. The WTRU 102 may obtain security related information to be used at the RRC layer (e.g., security parameters like the ones provided by the PC5 signaling layer on the DCR message and/or temporary keys) to protect the initial RRC message. Similar to the provisioned certificates, only the initial RRC message is to be or needs to be protected using the information/parameters from the gNB 180).

Representative Procedures Using AS Layer Information

The AS layer may send and/or may need to send information during the link establishment procedure. As an example, (1) WTRU capabilities may be sent to the peer WTRU 102 to make sure the link may be established; or (2) AS configuration information may be communicated/exchanged (e.g., may need to be exchanged), e.g., to agree on various parameters, for example the used/required QoS. The AS layer information (e.g., the WTRU capabilities & AS layer configuration information) may contain and/or include sensitive information that is to be and/or needs to be protected. Examples of sensitive information may include:

(1) WTRU capabilities (which may consist of or include, for example a list of security algorithms that are supported, i.e., security capabilities. In certain representative embodiments, certain information/parameter may not be exchanged or may not need to be exchanged for each link establishment between two WTRUs 102a and 102b. For example, if a WTRU 102a already has the capabilities associated with a peer WTRU 102b (from a previous link establishment) capability transfer may not be used/needed); and/or (2) AS layer configuration information (which may consist of or include, for example any of: a Sequence Number (SN) length (e.g., for PDCP), an RLC mode, a QoS profile, a resource pool configuration, an RLF/RLM configuration, and/or a reference signal configuration, among others. The AS layer configuration information may be or may need to be exchanged with each link establishment between two WTRUs 102a and 102b), among others.

Representative Provisioning Procedure Per V2X application

A "Connection_type"/service level indication may be provisioned on a per V2X application basis in addition to or in lieu of the PC5 signaling security parameters (e.g., the list of supported algorithms, etc.). The Connection_type may be specified in the DCR message. Depending on the value of the Connection_type, a set of parameters for C-plane and/or U-plane may be specified or may need to be specified on the same message. Connection_type may be represented by a multi-bit value indicating any of the following: a Connection_type and/or security level of "U-plane only", "U-plane+C-plane" or "C-plane only". A set of security parameters (e.g. algorithm, etc., again per V2X application) for C-plane may be provisioned if the "connection_type" indicates "C-plane" or "U-plane+C-plane", in addition to the set of parameters for the U-plane.

The PC5 signaling over the C-plane or the U-plane may be provisioned on a per V2X application basis, and may indicate if the PC5 signaling is to be sent over the U-plane or the C-plane. The link establishment and messages transfer are done, accordingly.

The V2X data over the C-plane or the U-plane may be provisioned on a per V2X application and may indicate if the V2X data packets may be or are to be sent over the U-plane or the C-plane.

FIG. 7 is a flowchart illustrating a representative security procedure (e.g., for unicast communications by a WTRU with another WTRU).

Referring to FIG. 7, the representative procedure 700 may include, at 710, the WTRU (e.g., WTRU 102a) sending, to the other WTRU (e.g., WTRU 102b) via a PC5 interface, a communication request indicating first security information for the WTRU 102a. At 720, the WTRU 102a may receive, from the other WTRU 102b via the PC5 interface, information which is integrity protected indicating second security information for the other WTRU 102b. At 730, the WTRU 102a may derive, from the indicated second security information, a first set of security keys for communication via a first layer using the U-plane and a second set of security keys for communication via a second layer using the C-plane. At 740, the WTRU 102a may send, to the other WTRU 102b via the PC5 interface, a message that is at least integrity protected using the derived first set of keys.

In certain representative embodiments, the communication request may include information indicating a connection type or a service level of a first type that uses both a user plane (U-plane) and a control plane (C-plane), and/or the first security information for the WTRU 102a.

In certain representative embodiments, the information received via the PC5 interface which is integrity protected may be included in a Direct Security Mode (DSM) Command message.

In certain representative embodiments, the second security information may include parameters associated with the first and second layers in accordance with the first type of connection indicated, for example, in the sent communication request.

In certain representative embodiments, the communication request may be sent in the clear (e.g., without security protection).

In certain representative embodiments, the WTRU 102a may verify an integrity of the DSM Command prior to sending the message.

In certain representative embodiments, the first layer may be a V2X layer and the second layer may be a Radio Resource Control (RRC) layer.

In certain representative embodiments, the derivation of the first set of security keys for communication via the first layer using the U-plane and the second set of security keys for communication via the second layer using the C-plane may include deriving one or more security keys by a V2X layer, as the first layer, and one or more further security keys by a Radio Resource Control (RRC) layer, as the second layer.

In certain representative embodiments, the derived keys may be used by a Packet Data Convergence Protocol (PDCP) layer.

In certain representative embodiments, the connection type/security level may indicate one of: (1) the first type of connection/service level that uses both U-plane and C-plane resources; (2) a second type of connection/service level that uses only U-plane resources; or (3) a third type of connection/service level that uses only C-plane resources.

In certain representative embodiments, the message may include WTRU capabilities and Access Stratum (AS) layer configuration information that may be ciphered and/or integrity protected.

FIG. 8 is a flowchart illustrating another representative security procedure (e.g., for unicast communications by a WTRU with another WTRU).

Referring to FIG. 8, the representative procedure 800 may include, at 810, the WTRU (e.g., WTRU 102a) receiving from the other WTRU 102a via a PC5 interface, a communication request including a connection type/service level indicating a first type of connection/service level using both a user plane (U-plane) and a control plane (C-plane), and/or first security information for the other WTRU 102a. At 820, the WTRU 102b may derive, from the first security information, a first set of security keys for communication via a first layer using the U-plane and/or a second set of security keys for communication via a second layer using the C-plane. At 830, the WTRU 102b may send, to the other WTRU 102a via the PC5 interface, a Direct Security Mode (DSM) Command message which may be integrity protected indicating second security information for the WTRU 102b. At 840, the WTRU 102b may receive, from the other WTRU 102a via the PC5 interface, a message that is at least integrity protected using the derived first set of keys.

In certain representative embodiments, the second security information may include parameters associated with the first and second layers in accordance with the first type of connection/service level indicated in the received communication request.

In certain representative embodiments, the communication request may be received in the clear (e.g., without security/security protection).

In certain representative embodiments, the WTRU 102b may provide integrity protection for the DSM Command message to be sent to the other WTRU 102a.

In certain representative embodiments, the first layer may be a V2X layer and/or the second layer may be a Radio Resource Control (RRC) layer.

In certain representative embodiments, the derivation of the first set of security keys for communication via the first layer using the U-plane and/or the second set of security keys for communication via the second layer using the C-plane may include deriving one or more security keys by a V2X layer, as the first layer, and one or more further security keys by a Radio Resource Control (RRC) layer, as the second layer, and the derived keys may be used by a Packet Data Convergence Protocol (PDCP) layer.

In certain representative embodiments, the connection type/service level may indicate one of: (1) the first type of connection/service level that uses both U-plane and C-plane resources; (2) a second type of connection/service level that uses only U-plane resources; or (3) a third type of connection/service level that uses only C-plane resources.

In certain representative embodiments, the message may include WTRU capabilities and Access Stratum (AS) layer configuration information that may be ciphered and/or integrity protected.

In certain representative embodiments, the WTRU 102b may receive with the communication request a security certificate signed by a trusted entity to validate the WTRU 102a to the other WTRU 102b.

FIG. 9 is a flowchart illustrating a further representative security procedure (e.g., for unicast communications by a WTRU with another WTRU).

Referring to FIG. 9, the representative procedure 900 may include, at 910, the WTRU (e.g., WTRU 102a) sending to the other WTRU (e.g., WTRU 102b) via a PC5 interface, a communication request including first security information associated with the WTRU 102a. At 920, the WTRU 102a may receive by a second layer of the WTRU 102a from the second layer of the other WTRU 102b, a Direct Security Mode (DSM) Command which may be integrity protected and indicating second security information for the other WTRU 102b. At 930, the WTRU 102a may derive from the second security information, a set of security keys for communication via the C-plane. At 940, the WTRU 102a may send to the other WTRU 102b, a message that may at least be integrity protected using the derived set of keys. At 950, the WTRU 102a may receive from the other WTRU 102b via the PC5 interface via the first layer, a communication accept message that may be ciphered and/or integrity protected.

In certain representative embodiments, the sending of the message that is at least integrity protected using the derived set of keys may include exchanging AS layer information via the second layer, which may be ciphered and integrity protected.

In certain representative embodiments, the sending of the message that is at least integrity protected using the derived set of keys may include sending a DSM Complete message indicating AS layer information associated with the other WTRU 102b that is ciphered and integrity protected.

In certain representative embodiments, the WTRU 102a may receive, via the second layer, a DSM Acknowledgement, that may be ciphered and integrity protected, indicating AS layer information associated with the WTRU 102b.

FIG. 10 is a flowchart illustrating an additional representative security procedure (e.g., for unicast communications by a WTRU with another WTRU).

Referring to FIG. 10, the representative procedure 1000 may include, at 1010, the WTRU (e.g., WTRU 102b) receiving from the other WTRU 102a via a first layer, a communication request including first security information associated with the other WTRU 102a. At 1020, the WTRU 102b may send, by the first layer of the WTRU 102b to a second layer of the WTRU 102b, a link establishment message. At 1030, the WTRU 102b may derive, from the first security information, a set of security keys for communication via the C-plane. At 1040, the WTRU 102b may send, from the second layer of the WTRU 102b to the second layer of the other WTRU 102a, a Direct Security Mode (DSM) command, which may be integrity protected indicating second security information for the WTRU 102b. At 1050, the WTRU 102b may receive from the other WTRU 102a via the second layer, a message that may be at least integrity protected using the derived set of keys. At 1060, the WTRU 102b may send to the other WTRU 102a via the PC5 interface via the first layer, a communication accept message that may be ciphered and/or integrity protected.

In certain representative embodiments, the reception of the message that may be at least integrity protected using the derived set of keys may include exchanging AS layer information via the second layer, which may be ciphered and/or integrity protected.

In certain representative embodiments, the reception of the message that may be at least integrity protected using the derived set of keys may include receiving a DSM Complete message indicating AS layer information associated with the other WTRU 102b that may be ciphered and/or integrity protected.

In certain representative embodiments, the WTRU 102b may send, via the second layer, a DSM Acknowledgement, that may be ciphered and/or integrity protected, indicating AS layer information associated with the WTRU 102b.

FIG. 11 is a flowchart illustrating yet another representative security procedure (e.g., for unicast communications by a WTRU with another WTRU).

Referring to FIG. 11, the representative procedure 1100 may include, at 1110, a first layer of the WTRU 102b receiving from the first layer of the other WTRU 102a, a Direct Security Mode (DSM) Command indicating first security information for the other WTRU 102a. At 1120, the WTRU 102b may send, by the first layer of the WTRU 102b to a second layer of the WTRU 102b, a security establishment message. At 1130, the WTRU 102b may receive, by the first layer of the WTRU 102b from the second layer of the WTRU 102b, the first security information for the WTRU 102b. At 1140, the WTRU 102b may send and/or may receive over or using the C-plane, by the first layer of the WTRU 102b, Access Stratum (AS) layer information that may be ciphered and/or integrity protected. At 1150, the WTRU 102b may receive from the other WTRU 102a via a PC5 interface via the C-plane, a communication request that may be ciphered and/or integrity protected using C-plane keys. At 1160, the WTRU 102b may send to the other WTRU 102a via a PC5 interface via the C-plane, a communication accept message that may be ciphered and/or integrity protected using C-plane keys.

In certain representative embodiments, the first layer of the WTRU 102b may send to the first layer of the other WTRU 102a that may be associated with the C-plane, a DSM Complete including second security information for the WTRU 102b that may be integrity protected.

In certain representative embodiments, the WTRU 102b may derive from the first security information, a set of security keys for communication via the C-plane used by the first layer.

FIG. 12 is a flowchart illustrating yet further representative security procedure (e.g., for unicast communications by a WTRU with another WTRU).

Referring to FIG. 12, the representative procedure 1200 may include, at 1210, a first layer of the WTRU 102a receiving, from a second layer of the WTRU 102a, a security establishment message including first security information for the WTRU 102a. At 1220, the WTRU 102a may send, by the first layer of the WTRU 102a to the first layer of the other WTRU 102b, a Direct Security Mode (DSM) Command indicating the received first security information for the WTRU 102a. At 1230, the WTRU 102a may receive a DSM Complete message indicating second security information for the other WTRU 102b. At 1240, the WTRU 102a may derive, from the second security information, a set of security keys for communication via the C-plane used by the first layer. At 1250, the WTRU 102a may send and/or may receive, by the first layer of the WTRU 102a, Access Stratum (AS) layer information that may be ciphered and/or integrity protected. At 1260, the WTRU 102a may send, to the other WTRU 102b via a PC5 interface via the C-plane, a communication request that may be ciphered and/or integrity protected. At 1270, the WTRU 102a may receive, from the other WTRU 102b via the PC5 interface via the C-plane, a communication accept message that may be ciphered and/or integrity protected.

In certain representative embodiments, the reception of the DSM Complete indicating second security information for the other WTRU 102b may include receiving, by the first layer of the WTRU 102a from the first layer of the other WTRU 102b, the DSM Complete including the second security information for the other WTRU 102b that may be integrity protected.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a vehicle and/or another mobile device remotely. In the later a case, data may be transferred via wireline or wirelessly between the vehicles or other mobile device.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method, implemented by a first wireless transmit/receive unit (WTRU), the method comprising:
   receiving provisioning information including signaling security information associated with a Vehicle-to-Anything (V2X) service, the signaling security information indicating that an associated signaling security is any one of (1) required, (2) supported, or (3) not needed;
   sending, to a second WTRU, a direct communication request message including information indicating (1) which security algorithms are supported by the first WTRU and (2) the signaling security information;
   receiving, from the second WTRU, a direct security mode command message including information indicating an agreed security configuration in accordance with the signaling security information, wherein the signaling security information is associated with control signaling, and wherein the signaling security information indicates: (1) integrity protection of the control signaling is any one of required, supported, or not needed, and (2) confidentiality protection of the control signaling is any one of required, supported, or not needed;
   sending, to the second WTRU, a direct security mode complete message according to the agreed security configuration; and
   sending, to the second WTRU via direct communication, control signaling or one or more data transmissions protected with the agreed security configuration.

2. The method of claim 1, further comprising any of: sending to, or receiving from, the second WTRU, one or more messages to establish the agreed security configuration to be used between the first WTRU and the second WTRU.

3. The method of claim 1, wherein the signaling security information is associated with the one or more data transmissions.

4. The method of claim 3, wherein the provisioning information indicates any of: (1) integrity protection of the one or more data transmissions is required, supported, or not needed, and (2) confidentiality protection of the one or more data transmissions is required, supported, or not needed.

5. The method of claim 1, wherein:
   the first WTRU includes a communication stack;
   the information indicating the agreed security configuration is received by a V2X layer of the communication stack; and
   the method further comprises passing, via interlayer communications, the received information indicating the agreed security configuration to another layer of the communication stack.

6. A first wireless transmit/receive unit (WTRU), comprising:
   a transceiver configured to:
   receive provisioning information including signaling security information associated with a Vehicle-to-Anything (V2X) service, the signaling security information indicating that an associated signaling security is any one of (1) required, (2) supported, or (3) not needed;
   send, to a second WTRU, a direct communication request message including information indicating (1) which security algorithms are supported by the first WTRU and (2) the signaling security information;
   receive, from the second WTRU, a direct security mode command message including information indicating an agreed security configuration in accordance with the signaling security information, wherein the signaling security information is associated with control signaling, and wherein the signaling security information indicates: (1) integrity protection of the control signaling is any one of required, supported, or not needed, and (2) confidentiality protection of the control signaling is any one of required, supported, or not needed;
   send, to the second WTRU, a direct security mode complete message according to the agreed security configuration; and
   send, to the second WTRU via direct communication, control signaling or one or more data transmissions protected with the agreed security configuration.

7. The first WTRU of claim 6, wherein the transceiver is configured to any of: send to, or receive from, the second WTRU, one or more messages to establish the agreed security configuration to be used between the first WTRU and the second WTRU.

8. The first WTRU of claim 6, wherein the signaling security information is associated with the one or more data transmissions.

9. The first WTRU of claim 8, wherein the provisioning information indicates any of: (1) integrity protection of the one or more data transmissions is required, supported, or not needed, and (2) confidentiality protection of the one or more data transmissions is required, supported, or not needed.

10. The first WTRU of claim 6, wherein:
    the WTRU includes a communication stack;
    the information indicating the agreed security configuration is received by a V2X layer of the communication stack; and
    the WTRU is configured to pass, via interlayer communications, the received information indicating the agreed security configuration to another layer of the communication stack.

* * * * *